(12) United States Patent
Sasaki

(10) Patent No.: US 8,719,218 B2
(45) Date of Patent: May 6, 2014

(54) SERVER APPARATUS AND METHOD OF AQUIRING CONTENTS

(75) Inventor: Takamitsu Sasaki, Osaka (JP)

(73) Assignee: Panasonic Corporation, Osaka (JP)

( * ) Notice: Subject to any disclaimer, the term of this patent is extended or adjusted under 35 U.S.C. 154(b) by 25 days.

(21) Appl. No.: 13/391,670

(22) PCT Filed: Jun. 20, 2011

(86) PCT No.: PCT/JP2011/003510
§ 371 (c)(1), (2), (4) Date: Feb. 22, 2012

(87) PCT Pub. No.: WO2011/161934
PCT Pub. Date: Dec. 29, 2011

(65) Prior Publication Data
US 2012/0150795 A1  Jun. 14, 2012

(30) Foreign Application Priority Data

Jun. 23, 2010 (JP) ................................. 2010-143202

(51) Int. Cl.
*G06F 7/00* (2006.01)
*G06F 17/30* (2006.01)

(52) U.S. Cl.
USPC ........................................................ 707/609

(58) Field of Classification Search
USPC ........................................................ 707/609
See application file for complete search history.

(56) References Cited

U.S. PATENT DOCUMENTS

| | | | |
|---|---|---|---|
| 2007/0180265 A1 | 8/2007 | Hiroshi | |
| 2008/0310821 A1 | 12/2008 | Maeda | |
| 2009/0245657 A1 | 10/2009 | Osugi | |
| 2010/0274772 A1* | 10/2010 | Samuels | ........................ 707/693 |
| 2011/0099154 A1* | 4/2011 | Maydew et al. | .............. 707/692 |
| 2011/0184936 A1* | 7/2011 | Lymberopoulos et al. | ... 707/721 |

FOREIGN PATENT DOCUMENTS

| | | |
|---|---|---|
| EP | 1 100 023 | 5/2001 |
| JP | 2000-172539 | 6/2000 |
| JP | 2001-202283 | 7/2001 |

(Continued)

OTHER PUBLICATIONS

International Search Report issued Jul. 26, 2011 in International (PCT) Application No. PCT/JP2011/003510.

(Continued)

*Primary Examiner* — Rehana Perveen
*Assistant Examiner* — Mark E Hershley
(74) *Attorney, Agent, or Firm* — Wenderoth, Lind & Ponack, L.L.P.

(57) ABSTRACT

A server apparatus includes a content segment acquisition unit that sequentially acquires, from a client device, comparison counterpart segments constituting a part of a candidate content, each corresponding to each of comparison segments constituting a part of acquired contents, a duplication decision unit that compares, each time the comparison counterpart segment is acquired, the comparison counterpart segment and the corresponding comparison segment to thereby decide whether a content having the comparison segment that agrees with the comparison counterpart segment is included in the acquired contents, and a content acquisition unit that acquires the candidate content from the client device and stores the candidate content in the storage unit in the case where such a content is not included. The content segment acquisition unit aborts acquisition of a subsequent comparison counterpart segment in the case where the above content is not included.

16 Claims, 13 Drawing Sheets

(56) References Cited

FOREIGN PATENT DOCUMENTS

| JP | 2007-148885 | 6/2007 |
| JP | 2007-201861 | 8/2007 |
| JP | 2007-299266 | 11/2007 |
| JP | 2009-251667 | 10/2009 |

OTHER PUBLICATIONS

Extended European Search Report mailed Nov. 25, 2013 in corresponding European Application No. 11797823.9.

* cited by examiner

FIG. 4

Distinctive segment definition table 400

| Distinctive segment name | Segment definition | Distinctive segment size | Comparison postpone point |
|---|---|---|---|
| First distinctive segment | 1024 bytes from midpoint | 1024 bytes | N/A |
| Second distinctive segment | Last 1024 bytes | 1024 bytes | First comparison postpone point |
| Third distinctive segment | First 1024 bytes | 1024 bytes | N/A |

FIG. 5

Content database 500

| Content ID | First distinctive segment ID | Second distinctive segment ID | Third distinctive segment ID | Content size | Date and time of generation | File path |
|---|---|---|---|---|---|---|
| A | 100 | 120 | 130 | 100 KB | 0:00, January 1, 2010 | /Data/A.jpg |
| B | 100 | 200 | 300 | 200 KB | 0:00, February 1, 2010 | /Data/B.jpg |
| C | 200 | 300 | 400 | 200 KB | 0:00, February 1, 2010 | /Data/C.jpg |

FIG. 6

First content list 600

| Content ID | Content size | Date and time of generation | Resource path |
|---|---|---|---|
| IMG01 | 100 KB | 0:00, January 1, 2010 | http://10.0.0.2/IMG01.jpg |
| IMG02 | 200 KB | 0:00, February 1, 2010 | http://10.0.0.2/IMG02.jpg |
| IMG03 | 200 KB | 0:00, February 1, 2010 | http://10.0.0.2/IMG03.jpg |
| IMG04 | 200 KB | 0:00, February 1, 2010 | http://10.0.0.2/IMG04.jpg |

FIG. 7

Second content list 700

| Content ID | Duplication decision result | Distinctive segment acquisition status | Content size | Date and time of generation | Resource path |
|---|---|---|---|---|---|
| IMG01 | Unacquired | Acquired up to first distinctive segment | 100 KB | 0:00, January 1, 2010 | http://10.0.0.2/IMG01.jpg |
| IMG02 | Acquisition postponed | Acquired up to third distinctive segment | 200 KB | 0:00, February 1, 2010 | http://10.0.0.2/IMG02.jpg |
| IMG03 | Already acquired | Acquired up to first distinctive segment | 200 KB | 0:00, February 1, 2010 | http://10.0.0.2/IMG03.jpg |
| IMG04 | Comparison postponed | Acquired up to second distinctive segment | 200 KB | 0:00, February 1, 2010 | http://10.0.0.2/IMG04.jpg |

SERVER APPARATUS AND METHOD OF AQUIRING CONTENTS

TECHNICAL FIELD

The present invention relates to a server apparatus that acquires a content from a client device and stores the content in a storage unit.

BACKGROUND ART

Various devices such as personal computers, digital cameras, and video cameras are designed so as to store contents. To minimize the trouble of managing those contents, a home server is employed that acquires the contents from the mentioned devices and performs is centralized management of the contents. The device from which the home server acquires the contents will hereinafter be referred to as client device.

The client device transfers the contents to the home server through a network connected via an Ethernet (registered trademark) cable, a wireless local area network (LAN), or the like. The contents can also be transferred from the client device to the home server through a communication cable such as a universal serial bus (USB) cable or a card medium such as a memory card, instead of the network.

It is generally senseless to acquire again a content once acquired from the client device, and hence the home server does not duplicately acquire the same content. Acquiring the same content from the client device each time not only prolongs the time for the acquisition procedure, but also leads to over-consumption of the storage capacity of the home server. In the case where it is necessary to make a duplication of an already acquired content, it is generally less time-consuming and less troublesome to copy that content in the home server, than acquiring the content again from the client device.

Conventional methods of deciding whether a content stored in the client device (hereinafter, candidate content) has already been acquired by the home server, in order to avoid duplicate acquisition of the content already acquired from the client device, include employing a content identifier such as a file name or a content ID. In this case, the home server first acquires, from the client device, an identifier list of the contents stored in the client device. Then the home server compares the acquired identifier list with all the content identifiers previously acquired by the home server, to thereby identify an unacquired content and acquire only the unacquired content from the client device.

Another example of the conventional methods of deciding whether the candidate content has already been acquired by the home server is employing property information assigned to the contents (for example, see PTL 1). In this case, the home server compares the property information assigned to the already acquired contents with the property information assigned to the contents stored in the client device, to thereby identify an unacquired content and acquire the same.

Still another example of the conventional methods of deciding whether the candidate content has already been acquired by the home server is transmitting information about an untransferred content from the client device to the home server (for example, see PTL 2). In this case, the client device associates each of the stored contents with information that indicates whether the content has been transferred to the home server, and transmits the information about the untransferred content to the home server in response to a request from the home server or at a predetermined timing. The home server identifies the unacquired content on the basis of the information transmitted by the client device, and acquires the same.

In addition, the conventional methods of deciding whether the candidate content has already been acquired by the home server Include comparing the substance of the content (for example, see PTL 3 and PTL 4). In this case, the home server compares the concrete substance between the already acquired contents and the candidate content in the client device, to thereby decide whether the candidate content in the client device has already been acquired, and acquires the candidate content in the case where it has not been acquired, and stores the same in the storage unit.

CITATION LIST

Patent Literature

[PTL 1] Japanese Unexamined Patent Application Publication No. 2007-148885
[PTL 2] Japanese Unexamined Patent Application Publication No. 2007-299266
[PTL 3] Japanese Unexamined Patent Application Publication No. 2001-202283
[PTL 4] Japanese Unexamined Patent Application Publication No. 2009-251667

SUMMARY OF INVENTION

Technical Problem

However, employing the identifier or property information of the content so as to decide whether the home server has already acquired the candidate content is based on the premise that the same content is always given the same identifier or property information. Accordingly, in the case where such a premise is not guaranteed, it may be impossible for the home server to decide whether the candidate content has already been acquired.

It will be assumed, for example, that a client device A has assigned an identifier A to a content A stored therein and copied the content A in another client device B, and then the client device B has assigned an identifier B to the content A copied therein. In this case, the home server is unable to decide that the content A (Identifier A) in the client device A and the content A (Identifier B) in the client device B are the same content, since the respective identifiers are different. Thus, the home server acquires the content A (identifier B) from the client device B in duplication, despite having already acquired the content A (identifier A) from the client device A.

Likewise, it will be assumed that a client device C has assigned an identifier C to a content C stored therein, and another client device D has assigned the same identifier C to a content D stored therein. In this case, the home server is unable to decide that the content C (identifier C) in the client device C is different from the content D (identifier C) in the client device D. Thus, once the home server has acquired the content C (identifier C) from the client device C, the is home server decides that the content D (identifier C) in the client device D has already been acquired, thereby failing to acquire the content D.

With the method of transmitting the information about the untransferred content from the client device to the home server in order for the home server to decide whether the candidate content has already been acquired, the home server is unable to decide whether the content stored in the client device has already been acquired in the case where any of the client devices does not have the function to transmit the information about the untransferred content to the home sever. The use of the home server becomes complicated when only a part of the client devices is compatible with the home server. Besides, the foregoing system imposes a higher processing load on the client devices. The processing capacity of the client devices such as a digital camera and a video camera is generally low, and therefore assigning a content management job such as classifying transferred and untransferred contents to the client device may affect the main function of image shooting and so forth, thus degrading the convenience of use of the client device.

Further, with the method of comparing the concrete substance of the contents in order for the home server to decide whether the candidate content has already been acquired, the home server has to acquire the entire contents stored in the client device, for the purpose of comparison. However, in the case where the content acquired for comparison has proven to be a content already acquired, it means that the home server has duplicately acquired the same content which should not have been acquired.

As stated above, duplicated acquisition of an already acquired content prolongs the time for the acquisition operation of the home server, and degrades the usability thereof. According to PTL 3, for example, the home server acquires an HTML file from a Web server, and then compares a designated portion of an already acquired HTML file and that of the newly acquired HTML file, in order to decide whether the designated portion of the HTML file has been updated. By such a method, however, the home server acquires the entirety of the portion for comparison (entirety of the designated portion) from the Web server, and therefore the home server repeatedly acquires the same content as long as the portion for comparison is not updated. In addition, by this method the home server acquires not only the entirety of the portion for comparison but the entirety of the HTML file including the portion for comparison, which constitutes a significant amount of useless operation in the case where the portion for comparison has not been updated.

Still further, PTL 4 discloses an image search apparatus that searches for a counterpart image corresponding to an inputted image. However, this image search apparatus is configured so as to acquire the inputted image directly from a fixed camera, and the transfer of the inputted image from the camera to the image search apparatus is executed at such a high speed that does not affect the performance of the camera. Accordingly, the drawback in that the processing time is prolonged when the inputted image is duplicately acquired from a separate apparatus and usability is degraded is not taken into account at all.

The present invention has been accomplished in view of the foregoing problems, with an object to provide a server apparatus capable of efficiently deciding whether a candidate content is an unacquired content with a reduced amount of data transferred from a client device, even in the case where uniqueness of the identifier or property information of the content is not guaranteed.

Solution to Problem

To achieve the foregoing object, an aspect of the present Invention provides a server apparatus that stores a content acquired from a client device in a storage unit. The server apparatus includes a content segment acquisition unit configured to sequentially acquire, from the client device, comparison counterpart segments constituting a part of a candidate content, the comparison counterpart segments respectively corresponding to one of a plurality of comparison segments constituting a part of one or more already acquired contents stored in the storage unit; a duplication decision unit configured to compare, each time the content segment acquisition unit acquires the comparison counterpart segment, the comparison counterpart segment and the comparison segment corresponding to the comparison counterpart segment, to thereby decide whether a content including the comparison segment that agrees with the comparison counterpart segment is present among the already acquired contents; and a content acquisition unit configured to acquire the candidate content from the client device and store the candidate content in the storage unit in the case where the duplication decision unit decides that a content including the comparison segment that agrees with the comparison counterpart segment is not present among the already acquired contents. The content segment acquisition unit is configured to abort acquisition of a subsequent comparison counterpart segment of the candidate content, in the case where the duplication decision unit decides that a content including the comparison segment that agrees with the comparison counterpart segment is not present among the already acquired contents.

The server apparatus thus configured can decide the candidate content to be an unacquired content and acquire the candidate content from the client device, in the case where it is decided that the content including the comparison segment that agrees with the comparison counterpart segment is not included. Accordingly, it can be decided whether the candidate content is an unacquired content even though the uniqueness of the identifier or property information of the content is not guaranteed. The foregoing configuration also eliminates the need to acquire the entirety of the candidate content from the client device in order to decide whether the candidate content is an unacquired content, thereby suppressing the amount of data transferred from the client device. In addition, the acquisition of the comparison counterpart segment can be aborted in the case where the content including the comparison segment that agrees with the comparison counterpart segment is not included, which further suppresses the amount of data transferred from the client device.

Preferably, the server apparatus may further include a segment designation unit configured to designate data of a predetermined size from an initial portion of the already acquired content, data of a predetermined size from a central portion of the already acquired content, and data of a predetermined size preceding an end portion of the already acquired content, as the comparison segments.

Dispersing thus the comparison segments in the already acquired content makes each comparison segment more distinctive of the feature of the content, thereby facilitating more efficient comparison between the candidate content and the already acquired content.

Preferably, the server apparatus may further include a segment designation unit configured to designate the comparison segments such that a ratio of the comparison segments to the already acquired content satisfies a predetermined ratio.

Designating the plurality of comparison segments such that a ratio of the plurality of comparison segments to the already acquired content satisfies a predetermined ratio makes the plurality of comparison segments more distinctive of the feature of the content, thereby facilitating more efficient comparison between the candidate content and the already acquired content.

Preferably, a priority may be given to each of the plurality of comparison segments, and the content segment acquisition unit may be configured to acquire each of the comparison counterpart segments in order of the priority of the comparison segment to which the comparison counterpart segment corresponds.

Giving a priority to the comparison segment allows the comparison segment more distinctive of the feature of the content to be preferentially subjected to comparison, thereby increasing the probability of deciding the candidate content to be an unacquired content through a fewer times of comparison, than the case where the priority is not given.

Preferably, the duplication decision unit may be further configured to decide whether a content including the plurality of comparison segments that agrees with the plurality of comparison counterpart segments is present among the already acquired contents, in the case where the duplication decision unit decides that a content including the comparison segment that agrees with the comparison counterpart segment is present among the already acquired contents. The server apparatus may further include a display unit configured to display information about the candidate content in the case where the duplication decision unit decides that a content including the plurality of comparison segments that agrees with the plurality of comparison counterpart segments is present among the already acquired contents.

Such a configuration allows the information about the candidate content that is likely to agree with an already acquired content to be presented to the user.

Preferably, the display unit may be further configured to accept, from a user, an instruction indicating whether to acquire the candidate content from the client device, and the content acquisition unit may be configured to acquire the candidate content from the client device in accordance with the instruction accepted by the display unit.

Accepting thus the instruction of the user regarding the candidate content that is likely to be an already acquired content alleviates the load of the user, compared with accepting the user's instruction regarding all the candidate contents.

Preferably, the duplication decision unit may be further configured to decide whether a content including the plurality of comparison segments that agrees with the plurality of comparison counterpart segments is present among the already acquired contents, in the case where the duplication decision unit decides that a content including the comparison segment that agrees with the comparison counterpart segment is present among the already acquired contents, and the content acquisition unit may be configured to acquire the candidate content from the client device and store the acquired candidate content in the storage unit in the case where the duplication decision unit decides that a content including the plurality of comparison segments that agrees with the plurality of comparison counterpart segments is present among the already acquired contents.

Acquiring thus the candidate content all the comparison counterpart segments of which agree and which is hence more likely to be an already acquired content (less likely to be an unacquired content) from the client device allows the contents that may be unacquired contents to be acquired without omission from the client device.

Preferably, the content acquisition unit may be configured to acquire, in the case of acquiring a plurality of the candidate contents from the client device, the candidate contents with respect to which it has been decided that a content including the comparison segment that agrees with the comparison counterpart segment is not present among the already acquired contents, in preference to the candidate contents with respect to which it has been decided that a content including the plurality of comparison segments that agrees with the plurality of comparison counterpart segments is present among the already acquired contents.

Such an arrangement allows the candidate contents less likely to be already acquired contents (more likely to be unacquired contents) to be preferentially acquired sequentially. Accordingly, the probability that the acquisition of the content less likely to be an already acquired content has been completed is increased, despite that, for example, the operation of the server apparatus is suspended halfway.

Preferably, a priority may be given in advance to each of the plurality of candidate contents, and the content segment acquisition unit is configured to preferentially acquire the comparison counterpart segment of the candidate content having a higher priority among the plurality of candidate contents.

Such an arrangement allows the comparison of the candidate content having a higher priority to be preferentially performed, thereby improving the operation efficiency.

Preferably, the duplication decision unit may be further configured to (I) decide, in the case where said duplication decision unit decides that a content including the comparison segment that agrees with the comparison counterpart segment is present among the already acquired contents, whether a content including more than one comparison segment that agrees with more than one of the plurality of comparison counterpart segments is present among the already acquired contents, and (ii) degrade the priority of the candidate content from the priority given in advance, in the case where the duplication decision unit decides that the content including the more than one comparison segment that agrees with the more than one of the plurality of comparison counterpart segments is to present among the already acquired contents.

Such an arrangement allows the comparison of the candidate content more likely to be an already acquired content to be postponed, thereby allowing the comparison of undecided contents and acquisition of unacquired contents to be preferentially performed, which results in improved operation efficiency and reduced processing time.

Preferably, the duplication decision unit may be further configured to decide whether a content including the plurality of comparison segments that agrees with the plurality of comparison counterpart segments is present among the already acquired contents, in the case where the duplication decision unit decides that a content Including the comparison segment that agrees with the comparison counterpart segment is present among the already acquired contents, and the content acquisition unit may be configured to acquire the candidate content from the client device and store the acquired candidate content in the storage unit in the case where the duplication decision unit decides that a content including the plurality of comparison segments that agrees with the plurality of comparison counterpart segments is not present among the already acquired contents, and not to acquire the candidate content from the client device in the case where the duplication decision unit decides that a content including the plurality of comparison segments that agrees with the plurality of comparison counterpart segments is present among the already acquired contents.

Restricting thus the acquisition of the candidate content from the client device in the case where it is decided that the content including the plurality of comparison segments that agrees with the plurality of comparison counterpart segments is included prevents a candidate content that has once been acquired from being acquired again and suppresses the amount of data transferred from the client device.

Preferably, the server apparatus may further include a segment ID generation unit configured to (i) generate from the comparison segment a comparison ID being a code of a fixed length having a smaller data size than the comparison segment and representing the comparison segment, and (ii) generate from the comparison counterpart segment a comparison counterpart ID being a code of a fixed length having a smaller data size than the comparison counterpart segment and representing the comparison counterpart segment. The duplication decision unit is configured to compare the comparison counterpart ID and the comparison ID, to thereby compare the comparison counterpart segment and the comparison segment.

Reducing thus the size of data to be compared into a fixed length allows the comparison process to be performed at a higher speed.

Preferably, the segment ID generation unit may be configured to generate the comparison ID and the comparison counterpart ID on the basis of a hash function.

Employing the hash function so as to generate the comparison ID and the comparison counterpart ID facilitates the generation of the comparison ID and the comparison counterpart ID. Such an arrangement also reduces the probability that the comparison ID agrees with the comparison counterpart ID when the comparison segment is different from the comparison counterpart segment.

The present invention may be realized not only as the foregoing server apparatus, but also as a method of acquiring a content including the operations performed by the distinctive constituents of the server apparatus. The present invention may also be realized as a program that causes a computer to execute the operations of the content acquisition method. Further, such a program may naturally be distributed through a recording medium such as a compact disc read-only memory (CD-ROM) or a transmission medium such as the Internet.

In addition, the present invention may be realized as an integrated circuit including the distinctive constituents of the server apparatus.

Advantageous Effects of Invention

As is apparent from the foregoing description, the server apparatus according to an aspect of the present invention acquires partial data of the candidate content from the client device, instead of the entire data, so as to decide whether the candidate content is an unacquired content. The server apparatus can therefore efficiently decide whether the candidate content is an unacquired content with a reduced amount of data transferred from the client device, even in the case where uniqueness of the identifier or property information of the content is not guaranteed.

BRIEF DESCRIPTION OF DRAWINGS

FIG. 4 shows an example of a distinctive segment definition table according to the embodiment of the present invention.

FIG. 5 shows an example of a contents database according to the embodiment of the present invention.

FIG. 6 shows an example of a first content list according to the embodiment of the present invention.

FIG. 7 shows an example of a second content list according to the embodiment of the present invention.

DESCRIPTION OF EMBODIMENTS

Figure 1:
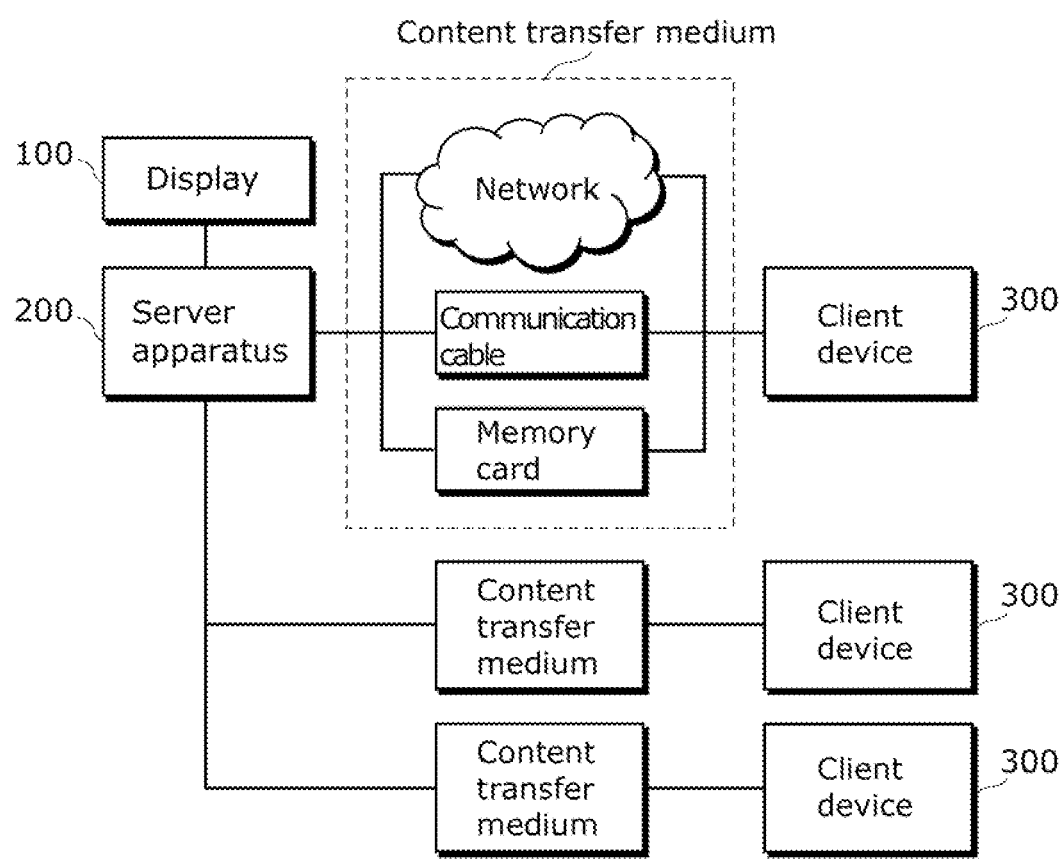
FIG. 1 is a block diagram showing a general configuration of a contents management system according to an embodiment of the present invention.

Hereafter, an embodiment of the present invention will be described referring to the drawings. In the drawings, the same constituents are given the same numeral.

A server apparatus 200 according to this embodiment sequentially acquires distinctive segments constituting a part of each candidate content stored in each of a plurality of client devices 300, instead of the entirety of the candidate content, and decides whether the candidate content is an unacquired content. In the case where the candidate content is decided to be an unacquired content, the server apparatus 200 aborts the acquisition of a subsequent distinctive segment of the candidate content, and acquires the candidate content from the client device.

The candidate content may be any of image data, movie data, document data or the like, and not specifically limited. In short, it suffices that the candidate content be electronic data. The unacquired content is herein defined as a content not stored in a storage unit 211 of the server apparatus 200. The distinctive segment is a part of a content.

FIG. 1 is a block diagram showing a general configuration of a contents management system according to the embodiment of the present invention. As shown therein, the contents management system includes the server apparatus 200 and the plurality of client devices 300.

The server apparatus 200 acquires the entire content or the distinctive segment which is a part thereof from each of the plurality of client devices 300 through a content transfer medium. The server apparatus 200 has the function of outputting the content acquired from the client device 300 and information to a user, to a display 100.

The client device 300 may be exemplified by a digital camera, a video camera, and a personal computer. Naturally, the client device 300 is not limited to a digital camera, a video camera, and a personal computer, but may be any device capable of transmitting a content or a part thereof to the server apparatus 200. In this embodiment, it will be assumed that the client device 300 is a digital camera.

The content transfer medium refers to a transmission line through which a content or a part thereof can be transmitted from the client device 300 to the server apparatus 200. More specifically, the content transfer medium may be, for example, a wired or wireless network, a communication cable, or a memory card. In this embodiment, the content transfer medium is a wireless LAN.

Figure 2:
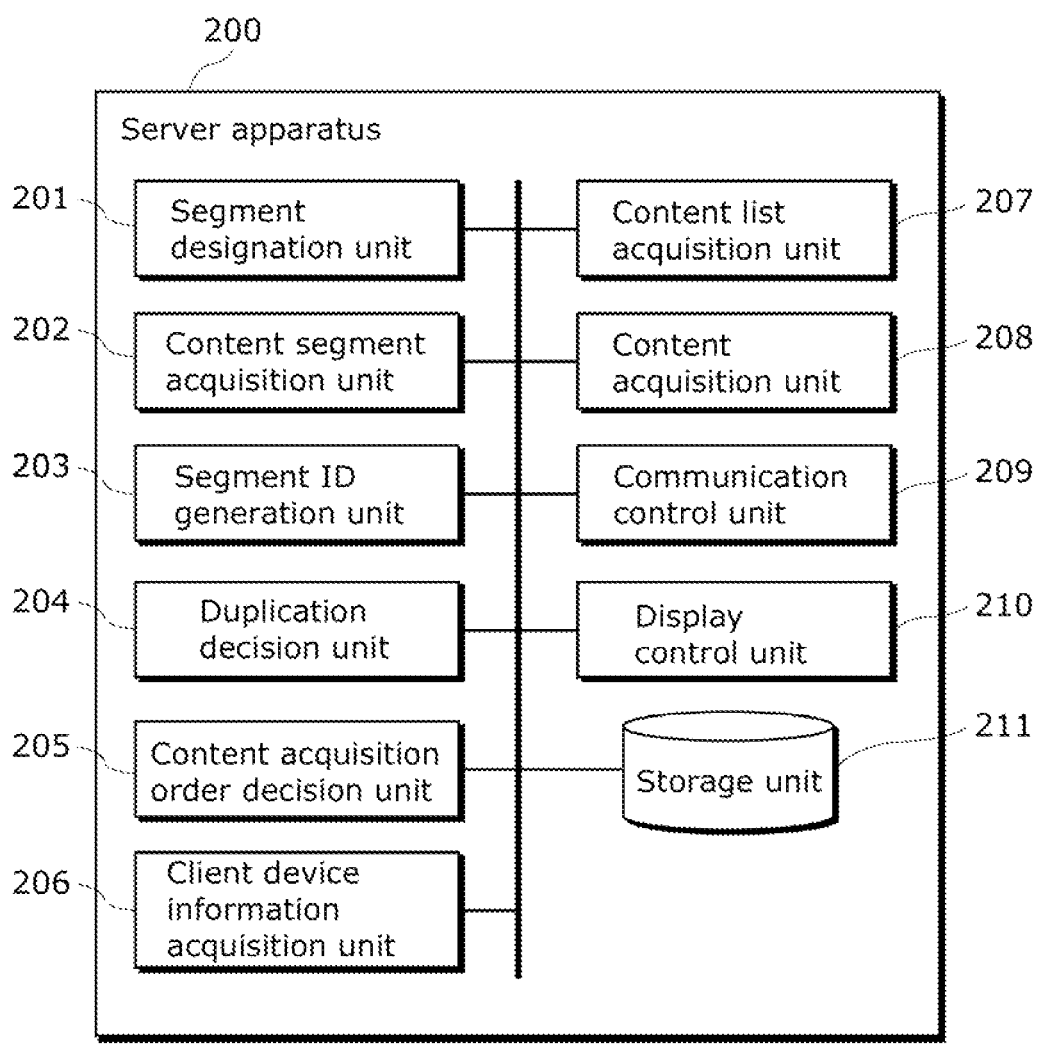
FIG. 2 is a block diagram showing an essential functional structure of a server apparatus according to the embodiment of the present invention.

FIG. 2 is a block diagram showing an essential functional structure of the server apparatus 200 according to the embodiment of the present invention. As shown therein, the server apparatus 200 includes a segment designation unit 201, a content segment acquisition unit 202, a segment ID generation unit 203, a duplication decision unit 204, a content acquisition order decision unit 205, a client device information acquisition unit 206, a content list acquisition unit 207, a content acquisition unit 208, a communication control unit 209, a display control unit 210, and the storage unit 211.

The segment designation unit 201 designates a plurality of distinctive segments each composed of partial data of a content, the partial data being different from each other. In other words, the segment designation unit 201 designates a plurality of distinctive segments that each constitutes a part of one or more contents stored in the storage unit 211 (hereinafter, already acquired content), the part being different from each other.

The distinctive segment of the already acquired content corresponds to the comparison segment. Likewise, a distinctive segment of the candidate content corresponds to the comparison counterpart segment.

The segment designation unit 201 may automatically designate is the distinctive segments in accordance with information provided in advance (for example, in the manufacturing process of the server apparatus), or a user may input a designation instruction through an input unit (not shown).

In this embodiment, the segment designation unit 201 automatically designates the distinctive segments in accordance with information provided in the manufacturing process. More specifically, the segment designation unit 201 designates the distinctive segments of the already acquired contents on the basis of definitions common to all the acquired contents, for example the definitions registered in a distinctive segment definition table 400 shown in FIG. 4. The distinctive segment definition table 400 is contained in the storage unit 211.

As shown in FIG. 4, the distinctive segment definition table 400 contains the definitions of a first to a third distinctive segment. The definition of the first distinctive segment is the data of a section of 1024 bytes from the midpoint of the content. The definition of the second distinctive segment is the data of a section of 1024 bytes preceding the last byte of the content. The definition of the third distinctive segment is the data of a section of 1024 bytes from the 0-th byte of the content. Thus, the segment designation unit 201 looks up the distinctive segment definition table 400 shown in FIG. 4, to thereby designate, with respect to each of the already acquired contents, the data of a predetermined size from the head of the acquired content, the data of a predetermined size from the midpoint of the acquired content, and the data of a predetermined size preceding the end of the acquired content, as the plurality of distinctive segments of the acquired content. Here, it is preferable that the predetermined size be determined so as to keep the distinctive segments from being the same among different contents. It is also preferable that the predetermined size be determined so as not to overlap with each other. The details of the distinctive segment definition table 400 shown in FIG. 4 will be subsequently described.

The segment designation unit 201 thus designates the distinctive segments in a plurality of sections dispersed in the content, which leads to higher probability that the distinctive segments constitute information representing the unique feature of the content. In addition, the segment designation unit 201 designates the distinctive segments by regarding the content as a byte data row, rather than on the basis of the subject or type of the content, and therefore the distinctive segments can be designated on the basis of the common definitions, irrespective of the subject or type of the content.

Alternatively, the distinctive segment may be defined such that, for example, the total data size of the sections corresponding to all the distinctive segments occupies a predetermined portion of the data size of the entire content. In other words, the segment designation unit 201 may designate, with respect to each of the already acquired contents, the plurality of distinctive segments of the acquired content such that the ratio of the plurality of distinctive segments satisfies a predetermined ratio.

The predetermined ratio may be stored in advance in the segment designation unit 201. It is preferable that the predetermined ratio be set at a level that reduces the probability that the sections corresponding to that ratio in different contents agree with each other and that suppresses the load imposed by the comparison process.

For example, the segment designation unit 201 may designate, with respect to a content having an overall size of 100 kilobytes, 30 distinctive segments each having a size of 1 kilobyte, so that the distinctive segments occupy 30% of the content. In this case, designating the distinctive segments in 30 dispersed positions in the content so as to prevent these 30 distinctive segments from overlapping with each other leads to higher probability that the distinctive segments constitute the information representing the unique feature of the content. Naturally, the number or size of the distinctive segments is not limited to the foregoing example, provided that the distinctive segments represent the feature of the content. For example, the plurality of distinctive segments may include a portion that overlaps with that of another.

Although the definitions for designating the distinctive segments are common to all the already acquired contents in this embodiment, the definition may be different with respect to different contents. However, employing the common definitions to all the contents so designate the distinctive segments as in this embodiment allows reduction of the amount of data to be acquired by the server apparatus 200 from the client device 300 in order to decide whether the candidate content is an unacquired content. This is because, for the comparison between the candidate content and the already acquired contents based on the mutually corresponding distinctive segments, the server apparatus 200 can compare the distinctive segments with those of all the already acquired contents simply by acquiring once the distinctive segments of the candidate content.

The content segment acquisition unit 202 sequentially acquires from the client device 300 the distinctive segments of the candidate content respectively corresponding to the distinctive segments of the already acquired contents. The content segment acquisition unit 202 also aborts the acquisition of the distinctive segments of the candidate content, in the case where it is decided that the already acquired contents do not include a content including the distinctive segments that agree with the distinctive segments of the candidate content.

The segment ID generation unit 203 generates, from the distinctive segment of the already acquired content, a distinctive segment ID being a code of a fixed length having a smaller data size than the distinctive segment and representing the distinctive segment. The segment ID generation unit 203 also generates, from the distinctive segment of the candidate content, a distinctive segment ID being a code of a fixed length having a smaller data size than the distinctive segment and representing the distinctive segment. In this embodiment, the segment ID generation unit 203 employs secure hash algorithm (SHA)-1 of a hash function so as to generate the distinctive segment ID of a fixed length (20 bytes), from the distinctive segment.

It is to be noted that the distinctive segment ID of the already acquired content corresponds to the comparison ID, and the distinctive segment ID of the candidate content corresponds to the comparison counterpart ID.

For the comparison between the candidate content and the already acquired content, the server apparatus 200 compares the distinctive segment IDs generated by the segment ID generation unit 203 instead of comparing the distinctive segments of the two contents. The distinctive segments of the contents designated by the segment designation unit 201 may be large in size, or different in size among the contents. Accordingly, the server apparatus 200 compares the distinctive segment IDs of a fixed length having a smaller data size than the distinctive segment instead of comparing the distinctive segments of the contents, which allows the comparison process to be performed at a higher speed and facilitates the implementation of the server apparatus 200.

In this embodiment, for example, while the size of the distinctive segments is 1024 bytes as shown in the distinctive segment definition table 400 of FIG. 4, the distinctive segment ID is 20 bytes. Thus the size of the data to be compared is reduced by 1004 bytes, which naturally allows the comparison process to be performed at a higher speed.

It is not mandatory that the segment ID generation unit 203 employ a hash function such as the SHA-1 cited above to generate the distinctive segment ID. For example, the segment ID generation unit 203 may employ a cyclic redundancy check (CRC) function to generate the distinctive segment ID. The method of generating the distinctive segment ID is not specifically limited, but any method may be employed provided that the segment ID generation unit 203 can generate the distinctive segment ID by generating, from an inputted value, a value of a fixed length having a smaller size than the inputted value and representing the inputted value.

The duplication decision unit 204 compares the distinctive segment ID of the candidate content (comparison counterpart ID) and the distinctive segment ID of the already acquired content (comparison ID) one by one, to thereby decide whether the candidate content is an unacquired content. More specifically, the duplication decision unit 204 compares the comparison counterpart ID and the comparison ID each time the distinctive segment of the candidate content is acquired, to thereby decide whether a content having the distinctive segment that agrees with the distinctive segment of the candidate content is present among the already acquired contents.

The content acquisition order decision unit 205 determines the order in which the candidate contents are to be acquired from the client device 300, on the basis of the decision result given by the duplication decision unit 204.

The client device information acquisition unit 206 acquires, from the client device 300, client device information indicating the capability thereof. More specifically, the client device information includes at least information indicating whether an ID uniquely generated from the content (hereinafter, content unique ID) can be assigned to the content stored in the client device 300. The content unique ID can be generated for example by calculating a hash value of the content. However, it is not mandatory that the content unique ID be the hash value of the content, but it suffices that the ID be uniquely generated from the content and allow unique identification of the content. The client device information may also include information indicating whether information about the contents stored in the client device 300 such as the data size and date and time of generation may be provided to the server apparatus 200.

In the case where the client device information indicates that the client device 300 is capable of assigning the content unique ID to the content, the server apparatus 200 can decide whether the candidate content is an unacquired content on the basis of the content unique ID. For example, it will be assumed that the server apparatus 200 contains the content A (content unique ID: A) already acquired from a client device A capable of assigning the content unique ID to the content, while the client device A contains two contents, namely a content A and a content B (content unique ID: A). In this case, the server apparatus 200 can decide whether the content B is an unacquired content by comparing the content unique IDs between the already acquired content and the candidate content stored in the client device A.

The content list acquisition unit 207 acquires from the client device 300 a first content list containing information about the candidate contents stored in the client device 300. The details of the first content list to be acquired by the content list acquisition unit 207 will be subsequently described referring to FIG. 6.

The content acquisition unit 208 acquires the contents from the client device 300. More specifically, the content acquisition unit 208 acquires the entirety of a candidate content from the client device 300 in accordance with the decision result given by the duplication decision unit 204.

In this embodiment, a hypertext transfer protocol (HTTP) is employed for the content segment acquisition unit 202 and the content acquisition unit 208 to acquire the entirety or a part of a candidate content. Naturally, different protocols may be employed as long as the protocol allows the entirety or a part of a content to be acquired. In the case of employing a communication cable or a memory card as a content transfer medium also, any protocol may be employed provided that it allows the entirety or a part of a content to be acquired. In the case of employing a communication cable or a memory card as the content transfer medium, the content segment acquisition unit 202 and the content acquisition unit 208 may acquire the entirety or a part of a content by using a driver software and a portable operating system interface (POSIX) provided by the operating system (OS) as a read interface, in the case where a communication cable or a memory card is employed as the content transfer medium.

The communication control unit 209 controls the communication with the client device 300. As shown in FIG. 1, the communication control unit 209 utilizes a driver software or the like to control the communication made through a network or the content transfer medium such as a communication cable or a memory card. The content segment acquisition unit 202, the client device information acquisition unit 206, the content acquisition unit 208, and the content list acquisition unit 207 acquire the contents, the first content list, or the client device information from the respective client devices 300 through the communication control unit 209.

The display control unit 210 causes the display 100 to display a content acquired from the client device 300, a message to the user, and so forth. The set of the display control unit 210 and the display 100 corresponds to the display unit.

The storage unit 211 stores therein the content, the first content list, and the client device information acquired from the client device 300.

Figure 3:
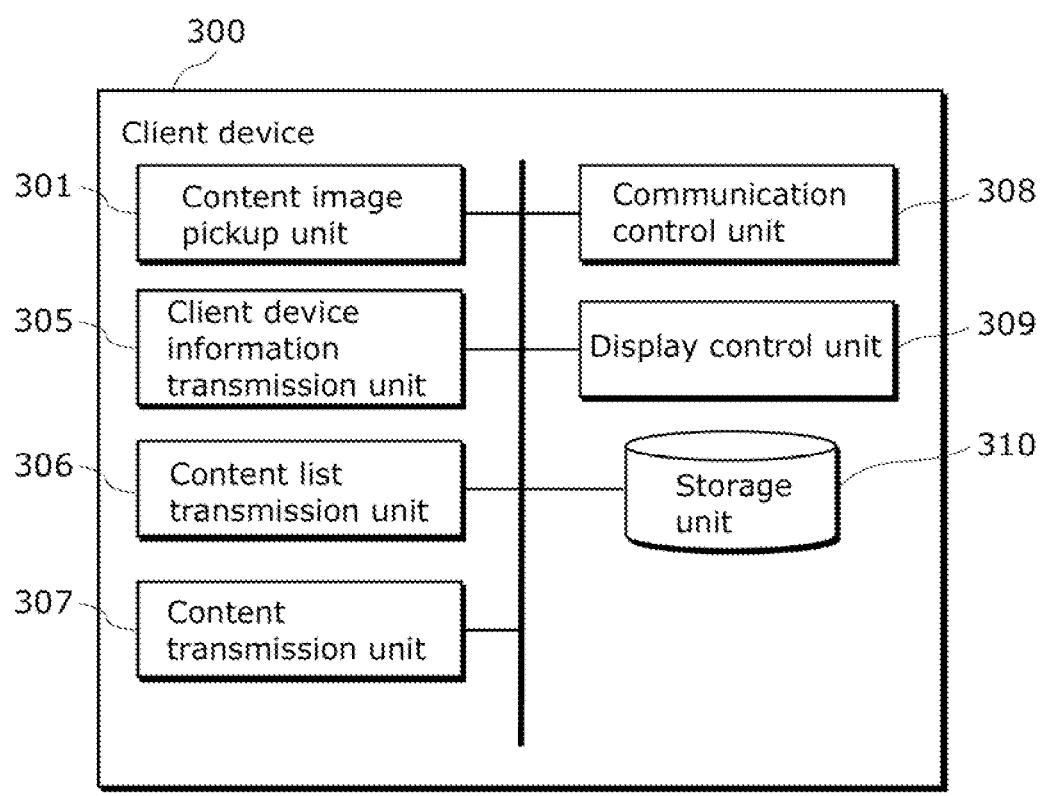
FIG. 3 is a block diagram showing an essential functional structure of a client device according to the embodiment of the present invention.

FIG. 3 is a block diagram showing an essential functional structure of the client device 300 according to the embodiment of the present invention. As shown therein, the client device 300 includes a content image pickup unit 301, a client device information transmission unit 305, a content list transmission unit 306, a content transmission unit 307, a communication control unit 308, a display control unit 309, and a storage unit 310.

The content image pickup unit 301 shoots the contents such as photos and videos, and stores the shot contents in the storage unit 310. The client device information transmission unit 305 transmits the client device information indicating the capability of the client device to the server apparatus 200. The content list transmission unit 306 transmits the first content list 600 to the server apparatus 200.

The content transmission unit 307 sequentially transmits the plurality of distinctive segments of the candidate content to the server apparatus 200, in accordance with a request from the server apparatus 200. The content transmission unit 307 also transmits the entirety of the candidate content to the server apparatus 200.

The communication control unit 308 has a function similar to that of the communication control unit 209 of the server apparatus 200, and controls the communication made through a network, a communication cable, a memory card, or the like. The display control unit 309 displays the content stored in the storage unit 310 on a display (not shown).

The client device 300 may be configured without the content image pickup unit 301, so as only to store contents shot by another device in the storage unit 310.

FIG. 4 shows an example of the distinctive segment definition table 400 according to the embodiment of the present invention. In this embodiment, the distinctive segment definition table 400 is generated by the segment designation unit 201, and stored in the storage unit 211.

In this embodiment, the distinctive segment definition table 400 contains distinctive segment names, definitions of the segments, sizes of the distinctive segment, and comparison postpone points. As stated above, the definitions of the distinctive segments are common to all the contents, in this embodiment. Therefore, the distinctive segments of all the contents can be defined according to the single distinctive segment definition table 400. In this embodiment, in addition, the definitions of the distinctive segments include the first distinctive segment corresponding to the section of 1024 bytes from the midpoint of the content, the second distinctive segment corresponding to the section of 1024 bytes preceding the last byte of the content, and the third distinctive segment corresponding to the section of 1024 bytes from the 0-th byte of the content. The definition of the respective distinctive segments is assigned with a priority for acquiring the distinctive segment determined in accordance with the definition. In this embodiment, the first distinctive segment has the highest priority; the second distinctive segment has the second highest priority; and the third distinctive segment has the lowest priority.

The content segment acquisition unit 202 acquires the distinctive segments of the candidate content stored in the client device 300 one by one, in order of the priority of the distinctive segments. The segment ID generation unit 203 generates the distinctive segment ID from the distinctive segments thus acquired. Then the duplication decision unit 204 compares the distinctive segment ID generated from the acquired distinctive segment with the corresponding distinctive segment ID of the already acquired content stored in the server apparatus 200 each time the content segment acquisition unit 202 acquires one of the distinctive segments of the candidate content, to thereby decide whether the candidate content is an unacquired content.

Assigning thus the priority to the distinctive segment allows the duplication decision unit 204 to preferentially compare the distinctive segments that are more distinctive of the feature of the content among the plurality of distinctive segments. Accordingly, the server apparatus 200 can decide whether the candidate content is an unacquired content through fewer times of comparison than in the case where the priority is not assigned. In other words, assigning the priority to the distinctive segments allows the server apparatus 200 to decide whether the candidate content is an unacquired content by acquiring fewer distinctive segments from the client device 300, so that the comparison can be completed with a reduced data transfer amount, which allows the comparison process to be performed at a higher speed.

Further, the definitions of the distinctive segment include a comparison postpone point. In the case where the server apparatus 200 is unable to affirm whether the candidate content is an unacquired content through comparison of the distinctive segment ID corresponding to the distinctive segment with the comparison postpone point and hence has to compare the distinctive segment ID corresponding to the distinctive segment of the next priority, the server apparatus 200 suspends and postpones the comparison currently being performed, and proceeds to comparison with respect to the next candidate content. The comparison postpone point may be set for a plurality of distinctive segments. In this embodiment, the comparison postpone point is solely set for the second distinctive segment.

The server apparatus 200 acquires the contents parallel to the comparison of the contents, each time a candidate content has been decided to be "unacquired". Accordingly, finding "unacquired" candidate contents quicker leads to reduction of the overall processing time for acquiring the contents. Here, the term "unacquired" means that the candidate content is a content unacquired yet by the server apparatus 200.

Assigning the comparison postpone point to the distinctive segment as in this embodiment allows the server apparatus 200 to postpone the comparison between the already acquired contents and the candidate content more likely to be an already acquired content (less likely to be unacquired) and preferentially perform the comparison between the already acquired contents and another candidate content more likely to be unacquired than the candidate content currently being compared. Accordingly, the server apparatus 200 can find the unacquired candidate contents more efficiently and in a shorter time, thereby reducing the processing time. Further, since the unacquired candidate contents are acquired with priority, the probability that the acquisition of the contents has been substantially completed is increased, despite that the operation suspended halfway because of a user's operation or malfunction.

In the case where the definition of the distinctive segments is to be made with respect to individual contents, the distinctive segment definition table 400 may be prepared for each of the contents, or the definition of the distinctive segments may be registered in a contents database 500 shown in FIG. 5. However, applying the definition of the distinctive segments in common to all the contents as in this embodiment is advantageous not only in that the data amount to be acquired by the server apparatus 200 from the client device 300 for comparison can be reduced, but also in that the data size stored in the server apparatus 200 is reduced since only one distinctive segment definition table 400 is stored.

FIG. 5 shows an example of the contents database 500 according to the embodiment of the present invention. The contents database 500 serves as a common database for the constituents of the server apparatus 200 to update and look up, and is stored in the storage unit 211.

In this embodiment, the contents database 500 is composed of content ID, first distinctive segment ID, second distinctive segment ID, third distinctive segment ID, content size, date and time of generation, and file path. Hereunder, each of these items of the contents database 500 will be described.

The content ID is a content unique ID assigned by the server apparatus 200 to each content. In the embodiment of the present invention, the server apparatus 200 employs a hash value of the content as the content unique ID. Naturally the content unique ID does not have to be the hash value of the content, but may be any ID that is uniquely generated from the content and that allows unique identification of the content. The first distinctive segment ID is the distinctive segment ID generated by the segment ID generation unit 203 from the first distinctive segment. The second distinctive segment ID is the distinctive segment ID generated by the segment ID generation unit 203 from the second distinctive segment. The third distinctive segment ID is the distinctive segment ID generated by the segment ID generation unit 203 from the third distinctive segment.

The distinctive segment IDs are also given the priority like the distinctive segments, in the same order as the priority of the distinctive segments. In other words, the priority becomes lower in the order of the first distinctive segment ID, the second distinctive segment ID, and the third distinctive segment ID. The server apparatus 200 compares the distinctive segment ID of the candidate content and that of the already acquired content corresponding to the distinctive segment ID of the candidate content, one by one in order of the priority.

The content size represents the data size of the content. The date and time of generation represents the date and time at which the content was generated in the client device 300. In the case where the date and time at which the content was generated in the client device 300 cannot be acquired, the date and time at which the server apparatus 200 has acquired the content is recorded. The file path represents the path through which the content file stored in the storage unit 211 can be accessed.

FIG. 6 shows an example of the first content list 600 according to the embodiment of the present invention. The content list acquisition unit 207 of the server apparatus 200 acquires the first content list 600 from the content list transmission unit 306 of the client device 300, thus to acquire the information about the candidate content stored in the client device 300.

In this embodiment, the first content list 600 is composed of content ID, content size, date and time of generation, and resource path. As shown in FIG. 6, the first content list 600 includes the information about four contents, IMG01 to IMG04. For example, the content having the content ID of IMG01 has a content size of 100 kilobyte (KB); was generated at 0:00 on Jan. 1, 2010; and can be accessed through the resource path of http://10.0.0.2/IMG01.jpg. Hereunder, each of these items of the first content list 600 will be described.

The content ID is an ID assigned by the client device 300 to each of the contents. The content IDs are assigned in different policies by the respective client devices 300. In other words, the same content may be given different content IDs and different contents may be given the same content ID, by different client devices 300.

The content size represents the data size of the content. The date and time of generation represents the date and time at which the content was generated in the client device 300.

The resource path represents the uniform resource identifier (URI) of the content. More specifically, the resource path represents the means and path through which the server apparatus 200 can make access to the content file stored in the client device 300. For example, the content having the content ID of IMG01 shown in FIG. 6 has the resource path of http://10.0.0.2/IMG01.jpg, which indicates that the content can be acquired upon making access to 10.0.0.2/IMG01.jpg by HTTP.

In the case where the memory card is employed for the data transfer from the client device 300 to the server apparatus 200, a relative path from the route directory of the memory card may be set as the resource path of the first content list 600.

In the case where the client device 300 is unable to register the content size and the date and time of generation in the first content list 600, the content size and the date and time of generation may be excluded from the first content list 600.

FIG. 7 shows an example of the second content list 700 according to the embodiment of the present invention. The second content list 700 is generated on the basis of the first content list 600, and includes the items of duplication decision result and distinctive segment acquisition status, in addition to those of the first content list 600. The remaining items, i.e., the content ID, the content size, the date and time of generation, and the resource path are similar to those of the first content list 600, and hence the description may be skipped where appropriate.

FIG. 7 indicates, for example, that the duplication decision result of the content having the content ID of IMG01 is "unacquired"; the distinctive segment acquisition status thereof is "acquired up to the first distinctive segment"; the content size is 100 KB; the date and time of generation is "0:00 on Jan. 1, 2010"; and the resource path is "http://10.0.0.2/IMG01.jpg".

The duplication decision result is updated by the duplication decision unit 204 of the server apparatus 200, and indicates the result of the decision as to whether the candidate content listed in the second content list 700 has already been acquired by the server apparatus 200. In the column of the duplication decision result, one of "unacquired", "already acquired", "comparison postponed", "acquisition postponed", "undecided", and "may be already acquired" is recorded. In this embodiment, at the time of generation of the second content list 700 from the first content list 600, all the contents are specified as "undecided" as initial setting of the duplication decision result.

In the case where the duplication decision result is "unacquired", it indicates that the relevant content has not yet been acquired by the server apparatus 200. When the duplication decision result is "already acquired", it indicates that the relevant content has already been acquired by the server apparatus 200. When the duplication decision result is "comparison postponed", it indicates that the priority for comparison of the relevant content has been degraded with respect to an "undecided" content. When the duplication decision result is "acquisition postponed", it indicates that although the relevant content has been decided to be unacquired yet by the server apparatus 200 the priority for acquisition has been degraded with respect to an "undecided" content. When the duplication decision result is "undecided", it indicates that the comparison of the relevant content has not yet been performed. When the duplication decision result is "may be already acquired", it indicates that the comparison of the relevant content is being performed. The second content list 700 shown in FIG. 7 indicates, for example, that the content having the content ID of IMG01 has been decided to be "unacquired" as the duplication decision result, and that the comparison of the content having the content ID of IMG04 has been postponed as the duplication decision result.

In short, the content acquisition unit 208 acquires the candidate contents specified as "unacquired" and "acquisition postponed" as the duplication decision result from the client device 300, and stores those contents in the storage unit 211. In contrast, the content acquisition unit 208 does not acquire the candidate contents specified as "already acquired" as the duplication decision result, from the client device 300.

The distinctive segment acquisition status is updated by the content segment acquisition unit 202, which registers the status of the distinctive segments of the contents already acquired from the client device 300. The distinctive segment acquisition status is useful especially when the duplication decision result in the second content list 700 is specified as "comparison postponed". When the duplication decision unit 204 is to again perform the comparison of the content specified as "comparison postponed" as the duplication decision result, the content segment acquisition unit 202 looks up the distinctive segment acquisition status to thereby identify the distinctive segment to be acquired next. For example, in FIG. 7 the content having the content ID of IMG02 is specified as "comparison postponed" as the duplication decision result and the distinctive segment acquisition status is "acquired up to second distinctive segment", and therefore the content segment acquisition unit 202 acquires the third distinctive segment.

In the case where the content size and the date and time of generation are not included in the first content list 600, the content size and the date and time of generation may be excluded from the second content list 700.

An operation of the server apparatus 200 thus configured will now be described hereunder. Referring to FIGS. 8 to 12, description will be made regarding the process through which the server apparatus 200 acquires the first content list 600 from the client device 300; decides whether the contents included in the first content list 600 are unacquired contents; and acquires the contents that have been decided as unacquired according to this embodiment. Here, it will be assumed that the segment designation unit 201 has designated in advance the distinctive segments of the already acquired contents in accordance with the distinctive segment definition table 400, and that the segment ID generation unit 203 has generated the distinctive segment IDs from the designated distinctive segments of the acquired contents and stored the distinctive segment IDs in the contents database 500.

First, the client device information acquisition unit 206 of the server apparatus 200 acquires the client device information from the client device information transmission unit 305 of the client device 300 (S801). Then the content list acquisition unit 207 of the server apparatus 200 acquires the first content list 600 from the content list transmission unit 306 of the client device 300 (S802). The acquired first content list 600 will subsequently be utilized as the second content list 700 in the server apparatus 200.

The duplication decision unit 204 of the server apparatus 200 selects one content specified as "undecided" or "comparison postponed" as the duplication decision result from the second content list 700 (S803). Here, the duplication decision unit 204 selects a content specified as "undecided" as the duplication decision result with priority to a content specified as "comparison postponed". Accordingly, the content specified as "undecided" as the duplication decision result in the second content list 700 is subjected to the process subsequent to S803 with priority to the content specified as "comparison postponed" as the duplication decision result. In other words, the duplication decision result in the second content list 700 indicates the priority for processing the candidate contents included in the second content list 700. Thus, the content segment acquisition unit 202 preferentially acquires the comparison counterpart segment of the candidate content having a higher priority among the plurality of candidate contents. Hereafter, the content selected at S803 will be referred to as "content for comparison".

The duplication decision unit 204 looks up the client device information acquired at S801 and decides whether a content unique ID can be assigned to the content stored in the client device 300 (S804). In the case where the client device 300 is unable to assign the content unique ID (NO at S804), the duplication decision unit 204 decides whether the content for comparison is "unacquired", on the basis of a duplicate acquisition avoidance system (S805).

In contrast, in the case where the client device 300 can assign the content unique ID (YES at S804), the duplication decision unit 204 decides whether the content for comparison is "unacquired" by using the content ID (S807). More specifically, the duplication decision unit 204 decides whether the content for comparison is "unacquired" depending on whether a content ID that agrees with that of the content for comparison is registered in the contents database 500. In the case where the identical content ID is not registered, the duplication decision unit 204 decides that the content for comparison is "unacquired" and updates the corresponding duplication decision result in the second content list 700 to "unacquired". In contrast, in the case where the identical content ID is registered the duplication decision unit 204 decides that the content for comparison is "already acquired", and updates the corresponding duplication decision result in the second content list 700 to "already acquired".

The duplication decision unit 204 checks whether all the candidate contents included in the second content list 700 have been decided to be one of "already acquired", "unacquired", and "acquisition postponed" (S806). In the case where all the candidate contents have been decided as one of these results (YES at S806), the process is finished. In the case where any of the candidate contents has not been decided as above (NO at S806), the process from S803 is repeated.

Figure 8:
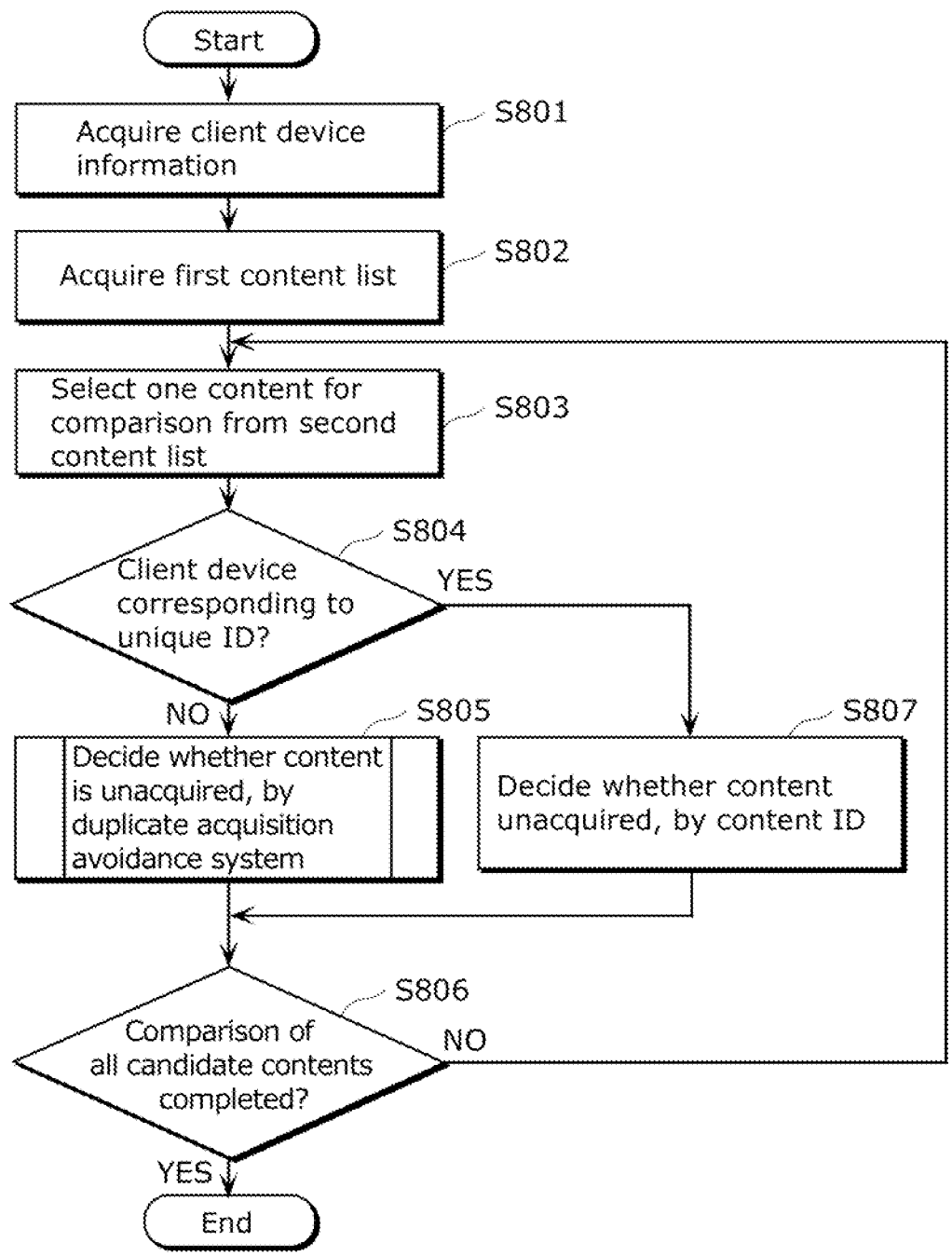
FIG. 8 is a flowchart showing a process executed by the server apparatus according to the embodiment of the present invention.
Figure 9:
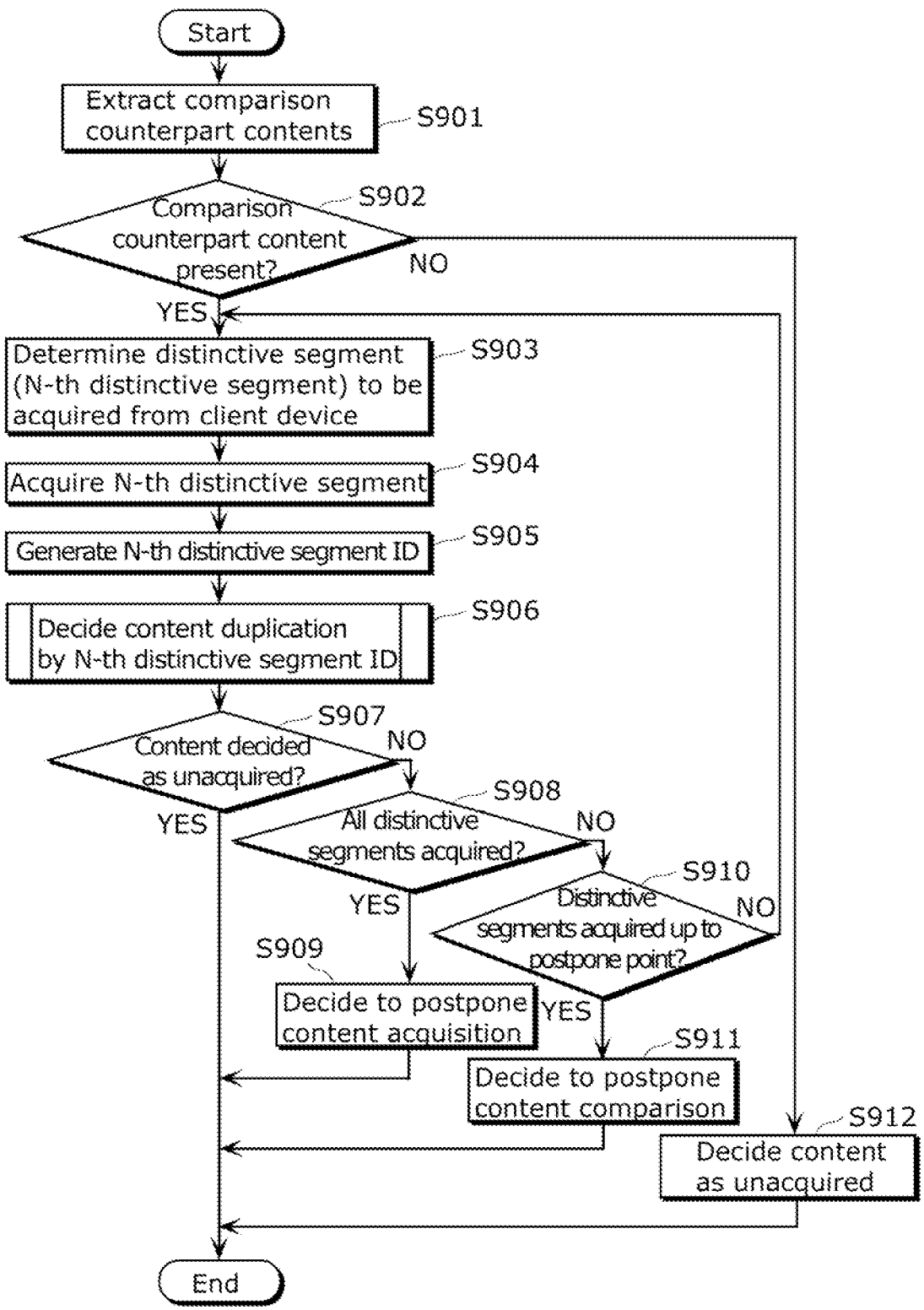
FIG. 9 is a flowchart showing a process of deciding whether a content for comparison is unacquired yet according to the embodiment of the present invention.

Referring now to FIG. 9, description will be made on the operation at S805 in FIG. 8, where the duplication decision unit 204 of the server apparatus 200 decides whether the content for comparison is selected at S803 is "unacquired", on the basis of a duplicate acquisition avoidance system.

First, the duplication decision unit 204 extracts the comparison counterpart contents to be compared with the content for comparison out of the already acquired contents stored in the server apparatus 200 (S901). More specifically, the duplication decision unit 204 acquires the size and the date and time of generation of the content for comparison from the second content list 700, and extracts all the already acquired contents having the size and the date and time of generation that are identical to those of the content for comparison from the contents database 500, as the comparison counterpart content. In the case where the contents database 500 does not include a content having the identical size and date and time of generation, the comparison counterpart content is not extracted.

In the case where only either of the size and the date and time of generation of the content for comparison can be acquired from the second content list 700, the duplication decision unit 204 selects all the contents either acquired data of which agrees from the contents database 500, as the comparison counterpart content. In the case where neither of the size and the date and time of generation of the content for comparison cannot be acquired from the second content list 700, the duplication decision unit 204 extracts all the contents registered in the contents database 500 as the comparison counterpart content. Hereafter, the one or more contents extracted at S901 will be referred to as comparison counterpart content.

Narrowing down thus the total number of comparison counterpart contents in advance on the basis of the information obtained by the duplication decision unit 204 from the second content list 700 reduces the number of times of the comparison between the content for comparison and the comparison counterpart contents, thereby enabling the comparison process to be performed at a higher speed.

Although the size and the date and time of generation of the contents are employed for the duplication decision unit 204 to extract the comparison counterpart contents in this embodiment, the Information such as the location of generation of the content or the user who has generated the content may be employed for extracting the comparison counterpart contents from the contents database 500. In this case, such information as the location of generation of the content or the user who has generated the content is registered in the contents database 500 of the second content list 700.

Then the duplication decision unit 204 decides whether one or more comparison counterpart contents extracted at S901 are present (S902). In other words, the duplication decision unit 204 decides whether one or more comparison counterpart contents have been extracted at S901.

In the case where no comparison counterpart content is present (NO at S902), the duplication decision unit 204 decides that the content for comparison is "unacquired", and records as "unacquired" in the duplication decision result of the second content list 700 (S912).

In the case where one or more comparison counterpart contents are present (YES at S902), the content segment acquisition unit 202 selects one distinctive segment to be acquired from the client device 300, in accordance with the priority (S903). Hereafter, the selected distinctive segment will be referred to as N-th distinctive segment. More specifically, the content segment acquisition unit 202 looks up the distinctive segment acquisition status of the second content list 700, and selects one distinctive segment to be acquired from the client device 300. For example, the content segments acquisition unit 202 recognizes that the distinctive segments of the content for comparison having the content ID of IMG04 have been already acquired up to the second distinctive segment upon looking up is the second content list 700 shown in FIG. 7, and therefore decides that the distinctive segment to be acquired from the client device 300 is the third distinctive segment.

Then the content segment acquisition unit 202 acquires the N-th distinctive segment of the content for comparison from the client device 300 (S904). Thus, the content segment acquisition unit 202 acquires the distinctive segments from the client device 300 one by one in order of the priority, each time the content segment acquisition unit 202 performs S903 and S904.

Further, the segment ID generation unit 203 generates the N-th distinctive segment ID of a fixed length from the N-th distinctive segment acquired as above, and records as "acquired up to the N-th distinctive segment" in the distinctive segment acquisition status of the second content list 700 (S905).

The duplication decision unit 204 decides whether the N-th distinctive segment ID of the content for comparison generated at S905 agrees with the respective N-th distinctive segment ID of all the comparison counterpart contents extracted at S901. In the case where the N-th distinctive segment ID of the content for comparison agrees with the N-th distinctive segment ID of none of the comparison counterpart contents, the duplication decision unit 204 decides that the content for comparison is "unacquired", and records as "unacquired" in the duplication decision result in the second content list 700 (S906).

In the case where the content for comparison has been decided as "unacquired" at S906 (YES at S907), the duplication decision unit 204 finishes the operation, but performs the process of S908 in the negative case (NO at S907).

Then the duplication decision unit 204 looks up the distinctive segment definition table 400 to thereby decide whether the N-th distinctive segment is the distinctive segment of the lowest priority (last distinctive segment) (S908). Here, the duplication decision unit 204 decides whether all the distinctive segments of the content for comparison have been decided to agree with the distinctive segments of the comparison counterpart content. In other words, the duplication decision unit 204 decides whether a content including the distinctive segments that agree with all the distinctive segments of the content for comparison is present among the comparison counterpart contents.

Here, in the case where the N-th distinctive segment is the distinctive segment of the lowest priority (YES at S908), the duplication decision unit 204 decides that the comparison counterpart content is to be acquired at a later time, and records as "acquisition postponed" in the duplication decision result of the second content list 700, thus finishing the process (S909).

In the case where all the distinctive segments of a comparison counterpart content agree with those of a content for comparison, it is Impossible to decide whether the content for comparison is "unacquired" or "already acquired". In other words, although all the distinctive segments agree between a content for comparison and a comparison counterpart content, another portion of these contents may be different from each other, and therefore the content for comparison cannot be decided to be "unacquired" nor "already acquired".

In this embodiment, therefore, the duplication decision unit 204 specifies the content for comparison all the distinctive segments of which agree with those of the comparison counterpart content as "acquisition postponed". As a result, the content acquisition unit 208 acquires the content for comparison all the distinctive segments of which agree with those of the comparison counterpart content, from the client device 300. In other words, the server apparatus 200 acquires the content for comparison from the client device 300 in the case where a content including a plurality of distinctive segments that agree with a plurality of distinctive segments of the content for comparison is present among the comparison counterpart contents. Such an arrangement allows the server apparatus 200 to acquire the contents that may be "unacquired" without omission. Further, the server apparatus 200 degrades the priority for acquisition of the content for comparison specified as "acquisition postponed" with respect to the contents decided to be "unacquired", so as to preferentially acquire the contents that have been firmly decided to be "unacquired". Consequently, even though the operation of the server apparatus 200 is suspended halfway, the probability is increased that acquisition of at least the contents decided to be "unacquired" has been completed.

In contrast, in the case where the N-th distinctive segment is not the distinctive segment of the lowest priority (NO at S908), the duplication decision unit 204 looks up the distinctive segment definition table 400 to thereby decide whether the N-th distinctive segment is specified as the comparison postpone point (S910).

In the case where the N-th distinctive segment is specified as the comparison postpone point (YES at S910), the duplication decision unit 204 decides that the comparison of the comparison counterpart content is to be postponed, and records as "comparison postponed" in the duplication decision result of the second content list 700, and finishes the operation (S911). Thus, the duplication decision unit 204 degrades the priority for the comparison of the content for comparison from the predetermined priority ("undecided"), in the case where it is decided that a content a part of the distinctive segments of which agrees with a part of the distinctive segments of the content for comparison is present among the comparison counterpart contents. The content segment acquisition unit 202 also suspends the acquisition of the distinctive segment of the content for comparison, in the case where it is decided that a content including a distinctive segment that agrees with a part of the distinctive segments is of the content for comparison is present among the comparison counterpart contents. Here, after the duplication decision unit 204 has selected the content specified as "comparison postponed" as the content for comparison at S803 in FIG. 8, the content segment acquisition unit 202 starts again the acquisition of the distinctive segment of that content for comparison. More specifically, at S904, which follows S803 in FIG. 8 where the duplication decision unit 204 repeatedly selects the content specified as "comparison postponed" in accordance with the priority as the content for comparison, the content segment acquisition unit 202 starts again the acquisition of the distinctive segment of such content for comparison. Thus, the content segment acquisition unit 202 preferentially acquires the comparison counterpart segment of the candidate content having a higher priority among the plurality of candidate contents.

In contrast, in the case where the N-th distinctive segment is not specified as the comparison postpone point (NO at S910), the process returns to S903.

Figure 10:
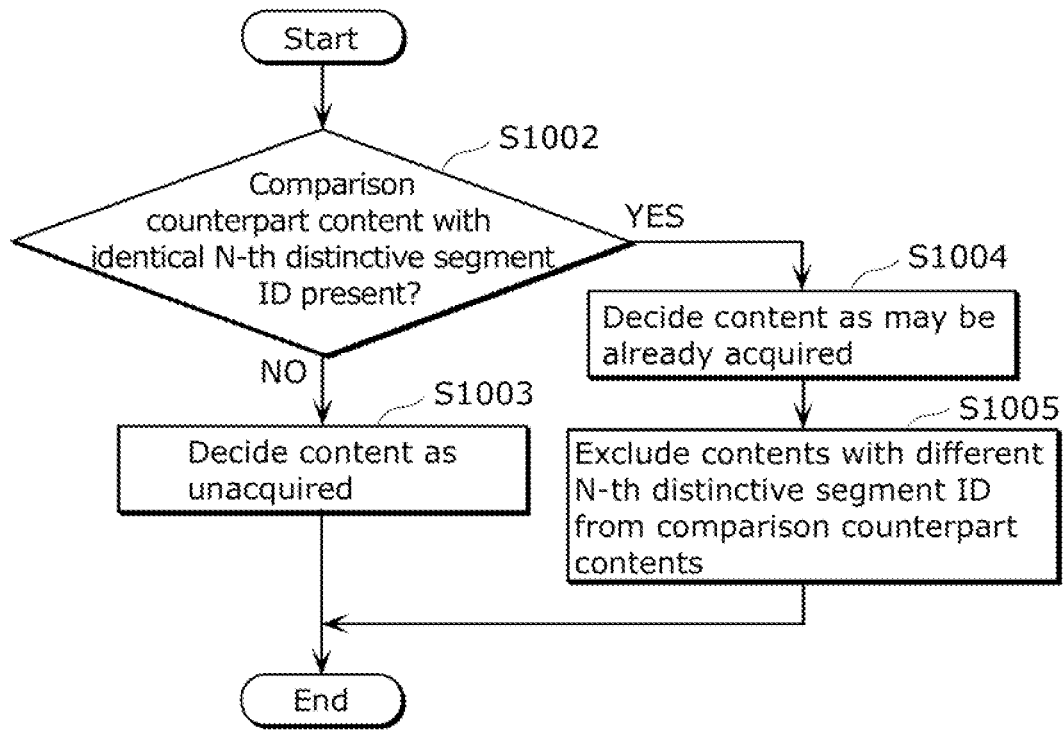
FIG. 10 is a flowchart showing a process of deciding whether a content for comparison is unacquired yet by comparing distinctive segment IDs.

Hereunder, the operation of the duplication decision unit 204 of the server apparatus 200 at S906 in FIG. 9 will be described referring to FIG. 10.

The duplication decision unit 204 decides whether the N-th distinctive segment ID of the content for comparison generated at S905 agrees with the N-th distinctive segment ID of all the comparison counterpart contents extracted at S901 (S1002).

In the case where the N-th distinctive segment ID of the content for comparison does not agree with the N-th distinctive segment ID of any of the comparison counterpart contents (NO at S1002), the duplication decision unit 204 decides that the content for comparison is "unacquired", and records as "unacquired" in the duplication decision result of the second content list 700 (S1003).

In contrast, in the case where the N-th distinctive segment ID of the content for comparison agrees with the N-th distinctive segment ID of at least one of the comparison counterpart contents (YES at S1002), the duplication decision unit 204 decides that the candidate content may have already been acquired, and records as "may be already acquired" in the duplication decision result of the second content list 700 (S1004).

Then the duplication decision unit 204 updates the comparison counterpart contents so as to include only those having the N-th distinctive segment ID that agrees with that of the content for comparison (S1005). In other words, the duplication decision unit 204 excludes the contents having the N-th distinctive segment ID that does not agree with the N-th distinctive segment ID of the content for comparison from the comparison counterpart contents.

Thus, in the case where the N-th distinctive segment ID of the content for comparison does not agree with the N-th distinctive segment ID of any of the comparison counterpart contents, it can be construed that a content including the same data at the same position as the content for comparison is not stored in the server apparatus 200, and therefore the server apparatus 200 can immediately decide that the content for comparison is "unacquired". In other words the server apparatus 200 can decide that the content for comparison is "unacquired" without acquiring all the remaining distinctive segments from the client device 300, which contributes to shortening the processing time.

Figure 11:
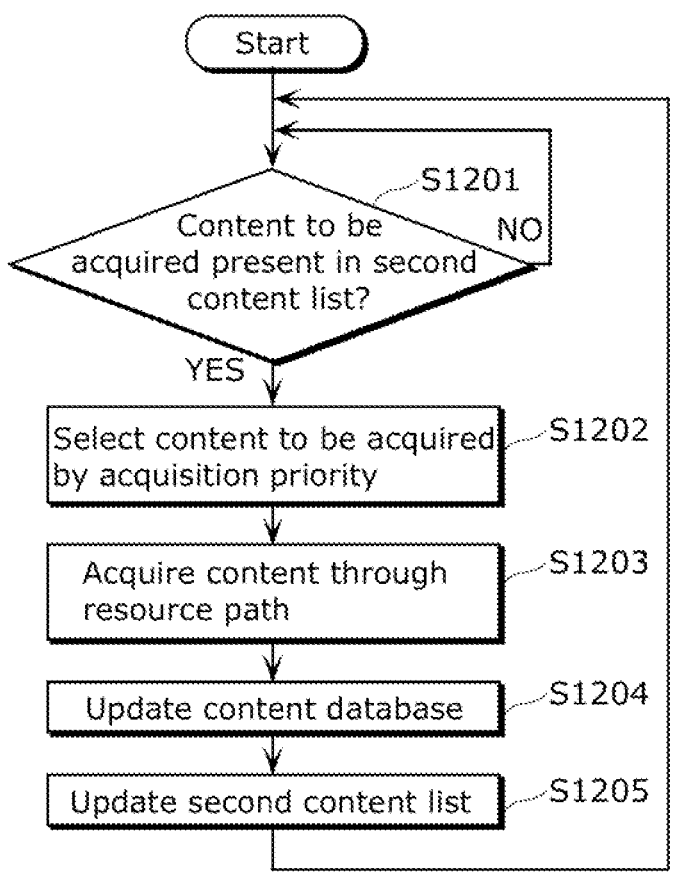
FIG. 11 is a flowchart showing a process through which the server apparatus acquires a content from the client device according to the embodiment of the present invention.

Referring now to FIG. 11, the operation of the server apparatus 200 according to this embodiment for acquiring the candidate content decided to be "unacquired" or "acquisition postponed" through the process shown in FIG. 8 will be described. The content acquisition process shown in FIG. 11 is performed parallel to the process of FIG. 8, such that the candidate content is acquired each time the candidate content is decided to be "unacquired" or "acquisition postponed".

First, the content acquisition unit 208 confirms whether a candidate content specified as "unacquired" or "acquisition postponed" in the duplication decision result of the second content list 700 is present (S1201). In the case where there is no candidate content specified as "unacquired" or "acquisition postponed" (NO at S1201), the content acquisition unit 208 repeats S1201.

In the case where the candidate content specified as "unacquired" or "acquisition postponed" is present (YES at S1201), the content acquisition order decision unit 205 selects a content to be acquired out of the candidate contents specified as "unacquired" or "acquisition postponed", in accordance with the priority for acquisition (S1202). More specifically, the content acquisition order decision unit 205 selects the candidate content specified as "unacquired" with priority to the candidate content specified as "acquisition postponed". To be more detailed, the content acquisition unit 208 acquires, when acquiring a plurality of candidate contents from the client device 300, the candidate content decided to include no distinctive segment that agrees with the distinctive segments of any of the already acquired contents ("unacquired") with priority to the candidate contents decided to include a plurality of distinctive segments that agrees with a plurality of distinctive segments of at least one of the already acquired contents ("acquisition postponed").

The content acquisition unit 208 acquires the resource path of the candidate content selected at S1202 from the second content list 700. The content acquisition unit 208 then acquires the candidate content from the client device 300 through the acquired resource path (S1203).

The content acquisition unit 208 records the information about the acquired content in the contents database 500 (S1204). More specifically, the content acquisition unit 208 generates the content unique ID with respect to the acquired content, and assigns the generated content unique ID as a new content ID and records in the contents database 500. The content acquisition unit 208 further records the distinctive segment ID of the acquired content in the contents database 500, upon calculating the distinctive segment ID at the time of performing S1204. However, in the case where the distinctive segment ID calculated in the process of FIG. 8 is retained, the content acquisition unit 208 may utilize that distinctive segment ID so as to record in the contents database 500.

The content acquisition unit 208 also calculates the size of the acquired content and records the content size in the contents database 500. Further, the content acquisition unit 208 records the date and time of generation of the acquired content registered in the second content list 700 in the contents database 500 as the date and time of generation of the same content. However, in the case where the date and time of generation of the acquired content is not registered in the second content list 700, the content acquisition unit 208 records the date and time at which the content has been acquired at S1203 in the contents database 500.

Then the content acquisition unit 208 deletes the information about the content acquired from the second content list 700 (S1205), and repeats the operation from S1201. Alternatively, at S1205 the content acquisition unit 208 may record as "already acquired" in the duplication decision result of the second content list 700 instead of deleting the information acquired from the second content list 700.

As described above, the server apparatus 200 according to this embodiment can decide that a candidate content is an unacquired content and acquire the candidate content from the client device, in the case where a given distinctive segment of the candidate content does not agree with the distinctive segments of any of the already acquired contents. Accordingly, the server apparatus 200 can decide whether the candidate content is an unacquired content even though the uniqueness of the identifier or property information of the content is not guaranteed. In addition, the server apparatus 200 does not have to acquire the entirety of the candidate content from the client device in order to decide whether the candidate content is an unacquired content, and therefore the amount of data transferred from the client device can be suppressed. Further, the server apparatus 200 can abort the acquisition of the distinctive segment in the case where a given distinctive segment of the candidate content does not agree with the distinctive segments of any of the already acquired contents, which further suppresses the amount of data transferred from the client device 300.

Although the embodiment of the server apparatus 200 according to an aspect of the present invention has been described, the present invention is in no way limited to the foregoing embodiment. Various modifications conceived by those skilled in the art and made to this embodiment without deviating from the spirit of the present invention will be included in the scope the present invention.

For example, although in the foregoing embodiment the duplication decision unit 204 specifies the content for comparison as "acquisition postponed" in the case where all the distinctive segments of the content for comparison agrees with all the distinctive segments of at least one of the comparison counterpart contents, a different process may be performed. Specifically, the duplication decision unit 204 may perform the process shown in FIG. 12, instead of S909 in FIG. 9. Hereunder, the process of FIG. 12 will be described.

The duplication decision unit 204 first displays information about the content for comparison and a message urging the user to instruct whether to acquire the content for comparison, on the display 100 through the display control unit 210 (S1101). In other words, the display control unit 210 causes the display 100 to display the Information about the content for comparison in accordance with the Instruction from the duplication decision unit 204.

The duplication decision unit 204 waits for the instruction of the user who has received the message, and once the display 100 accepts the user's instruction to acquire the content for comparison (YES at S1102), the duplication decision unit 204 decodes that the content for comparison is "unacquired" and records as "unacquired" in the duplication decision result of the second content list 700 (S1103). In the case where the display 100 has not accepted the user's instruction to acquire the content for comparison (NO at S1102), the duplication decision unit 204 decides that the content for comparison is "already acquired" and records as "already acquired" in the duplication decision result of the second content list 700 (S1104).

Figure 12:
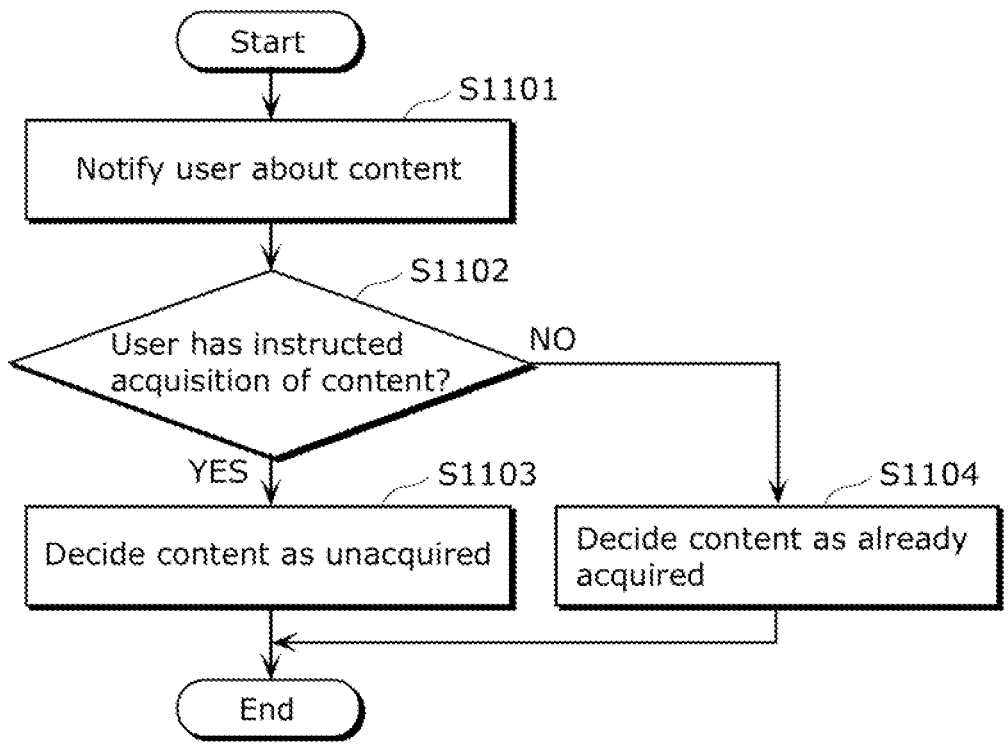
FIG. 12 is a flowchart showing a process of accepting an instruction from a user according to a variation of the embodiment of the present invention.

Here, the instruction made by the user at S1102 in FIG. 12 may be collectively applied to all the subsequent processes. Allowing thus the user to make a collective instruction exempts the user from inputting the same instruction with respect to each of the contents for comparison.

Figure 13:
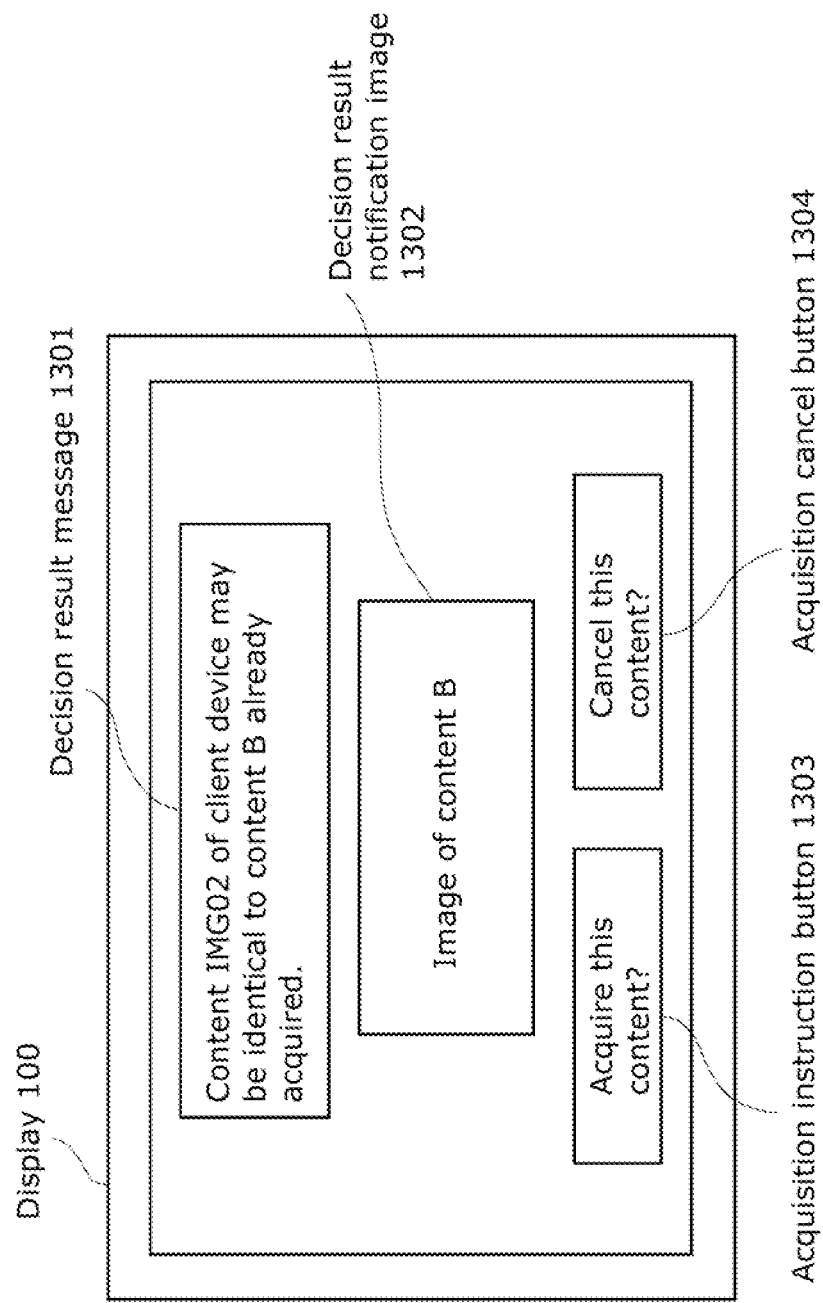
FIG. 13 is a schematic drawing showing an example of a user notification screen for the server apparatus to notify a processing result to the user according to a variation of the embodiment of the present invention.

Referring to FIG. 13, a user notification screen displayed on the display 100 by the duplication decision unit 204 at S1101 in FIG. 12 will be described. As shown in FIG. 13, the user notification screen Includes a decision result message 1301, a decision result notification image 1302, an acquisition instruction button 1303, and an acquisition cancel button 1304.

The decision result message 1301 is a text information including the content ID of the content for comparison and the content ID of the comparison counterpart content having the largest number of distinctive segment IDs that agree with those of the content for comparison. The message shown in FIG. 13 notifies by a text to the effect that the distinctive segment IDs agree best between the content having the content ID of "IMG02" in the contents database 500 and the content having the content ID of "IMG02" in the second content list 700.

The decision result notification image 1302 is a moving image information of the comparison counterpart content having the largest number of distinctive segment IDs that agree with those of the current content for comparison. In FIG. 13, the image of the content having the content ID of "B" in the contents database 500 is being displayed.

The acquisition instruction button 1303 is provided for the user to instruct the server apparatus 200 to acquire the content for comparison. The acquisition cancel button 1304 is provided for the user to instruct the server apparatus 200 not to acquire content for comparison.

The duplication decision unit 204 may specify the content for comparison as "already acquired" or "unacquired" at S909 in FIG. 9, instead of "acquisition postponed". Such an arrangement that the duplication decision unit 204 specifies as "already acquired" or "unacquired" at S909 instead of "acquisition postponed" allows the content acquisition order decision unit 205 to select the content to be acquired only from the unacquired contents at S1202 in FIG. 11, thereby eliminating the need to take the priority of the contents into account, which facilitates the implementation of the content acquisition order decision unit 205 and increases the processing speed. In the case where the duplication decision unit 204 has decided as "already acquired" at S909 in FIG. 9, the server apparatus 200 does not acquire the overall data of the content for comparison from the client device 300, and therefore server apparatus 200 is prevented from acquiring the content for comparison that may be already acquired, and the amount of data transferred from the client device 300 can be further suppressed.

For the duplication decision unit 204 to perform the process of S909 in FIG. 9, the operation to be performed may be determined in advance from among the foregoing operations, or may be determined by the user's instruction through an input unit (not shown) at the initial setup of the device.

In the foregoing embodiment the content segment acquisition unit 202 acquires the distinctive segments of the candidate contents one by one from the client device 300, however the distinctive segments may be acquired in different manners. For example, the content segment acquisition unit 202 may acquire the distinctive segments of the candidate contents by a plurality of numbers. Alternatively, the content segment acquisition unit 202 may acquire the distinctive segments of the candidate contents gradually Increasing the number of distinctive segments to be acquired at a time. With such an arrangement, the amount of data transferred from the client device 300 can be suppressed because the server apparatus 200 can abort the acquisition of the next distinctive segment yet to be acquired, when the candidate content is decided as "unacquired". Further, the server apparatus 200 can improve the acquisition efficiency of the distinctive segments of the candidate contents from the client device 300, by acquiring a plurality of the distinctive segments at a time.

Although in the foregoing embodiment the initial setting of the duplication decision result is "undecided" with respect to all the contents at the time that the second content list 700 is generated from the first content list 600, the duplication decision result may be set in different manners. In other words, the priority for the comparison initially specified does not have to be the same for the candidate contents. For example, the duplication decision result of the contents may be specified, at the time that the second content list 700 is generated from the first content list 600, such that the priority becomes different depending on the content size (for example, "undecided 1", "undecided 2", etc.). Such an arrangement allows the comparison of the candidate contents given a higher priority in advance to be preferentially performed, thereby improving the comparison efficiency.

Although the server apparatus 200 includes the constituents shown in FIG. 2 according to the foregoing embodiment, the server apparatus 200 does not have to include all of those constituents shown in FIG. 2. For example, the server apparatus 200 may only include the constituents shown in FIG. 14, out of those shown in FIG. 2.

Figure 14:
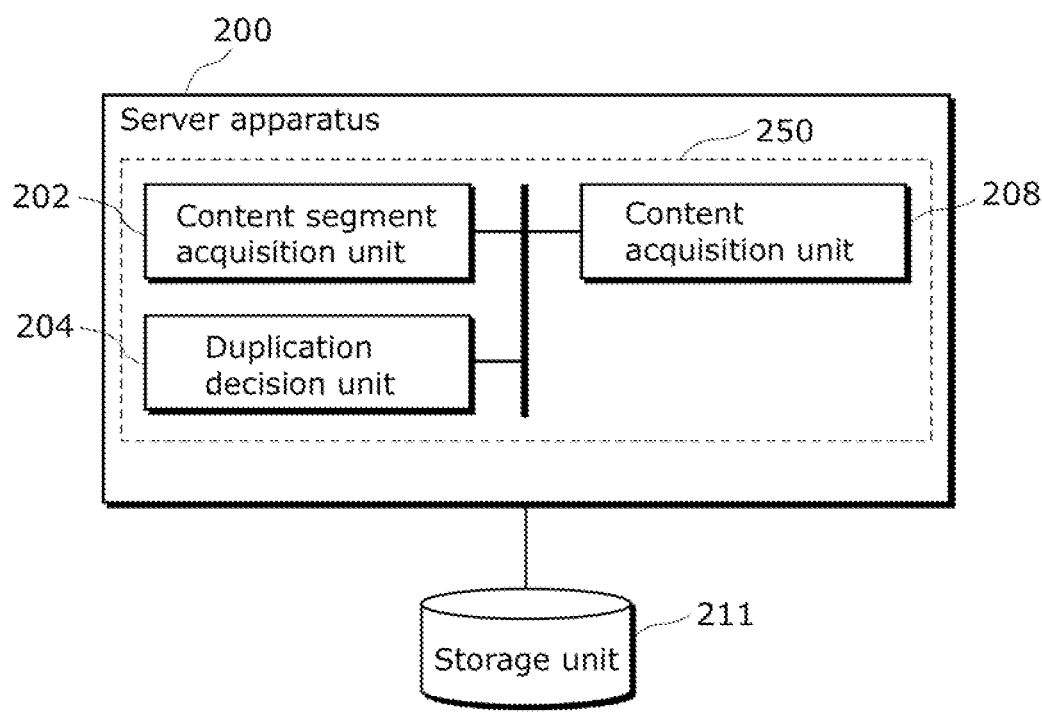
FIG. 14 is a block diagram showing a functional structure of the server apparatus according to a variation of the embodiment of the present invention.

FIG. 14 is a block diagram showing a functional structure of the server apparatus 200 according to a variation of the embodiment of the present invention. In this variation, the server apparatus 200 at least includes the content segment acquisition unit 202, the duplication decision unit 204, and the content acquisition unit 208. The server apparatus 200 is connected to the storage unit 211 acting as an external storage unit.

With the configuration of the server apparatus 200 as shown in FIG. 14, the duplication decision unit 204 can still decide whether an already acquired content including the distinctive segment that agrees with the distinctive segment of the candidate content is present. Accordingly, the duplication decision unit 204 can decide that a candidate content is an unacquired content in the case where a given distinctive segment of the candidate contents does not agree with the distinctive segments of any of the already acquired contents, and the content acquisition unit 208 can acquire the relevant candidate content from the client device. Consequently, the server apparatus 200 can decide whether the candidate content is an unacquired content even though the uniqueness of the identifier or property information of the content is not guaranteed. In addition, the server apparatus 200 does not have to acquire the entirety of the candidate content from the client device in order to decide whether the candidate content is an unacquired content, and therefore the amount of data transferred from the client device can be suppressed. Further, the content segment acquisition unit 202 can abort the acquisition of the distinctive segment in the case where a given distinctive segment of the candidate content does not agree with the is distinctive segments of any of the already acquired contents, and therefore the server apparatus 200 can further suppress the amount of data transferred from the client device.

The server apparatus 200 may be realized as a computer including a central processing unit (CPU), a read-only memory (ROM), a random access memory (RAM), a hard disk, and so forth.

A part or whole of the constituents of the constituents of the server apparatus 200 according to the foregoing embodiment may be contained in a single system large-scale integration (LSI). For example as shown in FIG. 14, the server apparatus 200 may be constituted of a system LSI 250 including the segment designation unit 201, the content segment acquisition unit 202, the duplication decision unit 204, and the content acquisition unit 208.

The system LSI 250 is an ultra-multifunction LSI containing a plurality of constituents integrated on a single chip, which is specifically a computer system including a microprocessor, a ROM, a RAM, and so on. The RAM stores therein a computer program. By operation of the microprocessor according to the computer program, the system LSI performs the functions.

Although the term "system LSI" is cited above, the circuit may also be called as IC, LSI, super LSI, or ultra LSI, depending on the degree of integration. Such a circuit integration may be realized in an exclusive circuit or a general-purpose processor, without limitation to the LSI. A field programmable gate array (FPGA) that can be programmed after manufacturing the LSI, or a reconfigurable processor that accepts rearrangement of circuit cells in the LSI may also be employed.

Further, when a new technique of integration that can be substituted for the LSI is developed with further progress of the semiconductor technology or a derivative technique, such new techniques may naturally be employed for the integration of the functional blocks. One of the possibilities is the application of the biotechnology.

The present invention may be realized not only as the server apparatus including the foregoing distinctive processing units, but also as a method of acquiring the contents arranged so as to perform the functions of the distinctive processing units of the server apparatus. In addition, the present invention may be realized as a computer program that causes a computer to execute the functions according to the method of acquiring the contents. Naturally, such a computer program may be distributed through a computer-readable recording medium such as a compact disc read-only memory (CD-ROM) or a communication network such as the Internet.

INDUSTRIAL APPLICABILITY

The server apparatus according to an aspect of the present invention can decide whether the candidate content is an unacquired content simply by acquiring a part of the data of the candidate content, instead of the entire data thereof, from the client device, and is therefore useful as a server apparatus that acquires the contents from a plurality of client devices to perform centralized management of the contents.

REFERENCE SIGNS LIST

100 Display
200 Server apparatus
201 Segment designation unit

202 Content segment acquisition unit
203 Segment ID generation unit
204 Duplication decision unit
205 Content acquisition order decision unit
206 Client device information acquisition unit
207 Content list acquisition unit
208 Content acquisition unit
209 Communication control unit
210 Display control unit
211 Storage unit
300 Client device
301 Content image pickup unit
305 Client device information transmission unit
306 Content list transmission unit
307 Content transmission unit
308 Communication control unit
309 Display control unit
310 Storage unit
400 Distinctive segment definition table
500 Contents database
600 First content list
700 Second content list

The invention claimed is:

1. A server apparatus that stores a content acquired from a client device in a storage unit, said server apparatus comprising:
a content segment acquisition unit configured to sequentially acquire, from the client device, comparison counterpart segments constituting a part of a candidate content, each of the comparison counterpart segments respectively corresponding to one of a plurality of comparison segments constituting a part of one or more already acquired contents stored in the storage unit;
a duplication decision unit configured to, while said content segment acquisition unit continues to sequentially acquire the comparison counterpart segments constituting the part of the candidate content, (i) compare, each time said content segment acquisition unit acquires one of the comparison counterpart segments constituting the part of the candidate content, the acquired comparison counterpart segment and the one of the comparison segments corresponding to the acquired comparison counterpart segment, and (ii) determine, based on a result of the comparison, whether a content including the one comparison segment that corresponds to the acquired comparison counterpart segment is present among the already acquired contents; and
a content acquisition unit configured to acquire the entire candidate content from the client device and store the acquired candidate content in the storage unit in a case where said duplication decision unit determines that the content including the one comparison segment that corresponds to the acquired comparison counterpart segment is not present among the already acquired contents,
wherein said content segment acquisition unit is configured to abort an acquisition of a comparison counterpart segment that is subsequent to a currently acquired comparison counterpart segment of the part of the candidate content, in the case where said duplication decision unit determines that the content including the one comparison segment that corresponds to the acquired comparison counterpart segment is not present among the already acquired contents.

2. The server apparatus according to claim 1, further comprising a segment designation unit configured to designate data of a predetermined size from an initial portion of the already acquired contents, data of a predetermined size from a central portion of the already acquired contents, and data of a predetermined size preceding an end portion of the already acquired contents, as the comparison segments.

3. The server apparatus according to claim 1, further comprising a segment designation unit configured to designate the comparison segments such that a ratio of the comparison segments to the already acquired contents satisfies a predetermined ratio.

4. The server apparatus according to claim 1,
wherein a priority is given to each of the plurality of comparison segments, and
said content segment acquisition unit is configured to acquire each of the comparison counterpart segments in an order of the priority of the comparison segment to which the comparison counterpart segment corresponds.

5. The server apparatus according to claim 1,
wherein said duplication decision unit is further configured to determine whether a content including the plurality of comparison segments that corresponds to the plurality of comparison counterpart segments is present among the already acquired contents, in the case where said duplication decision unit determines that the content including the one comparison segment that corresponds to the acquired comparison counterpart segment is present among the already acquired contents,
said server apparatus further comprises a display unit configured to display information about the candidate content in a case where said duplication decision unit determines that the content including the plurality of comparison segments that corresponds to the plurality of comparison counterpart segments is present among the already acquired contents.

6. The server apparatus according to claim 5,
wherein said display unit is further configured to accept, from a user, an instruction indicating whether to acquire the candidate content from the client device, and
said content acquisition unit is configured to acquire the candidate content from the client device in accordance with the instruction accepted by the display unit.

7. The server apparatus according to claim 1,
wherein said duplication decision unit is further configured to determine whether a content including the plurality of comparison segments that corresponds to the plurality of comparison counterpart segments is present among the already acquired contents, in the case where said duplication decision unit determines that the content including the one comparison segment that corresponds to the acquired comparison counterpart segment is present among the already acquired contents, and
said content acquisition unit is configured to acquire the candidate content from the client device and store the acquired candidate content in the storage unit, in a case where said duplication decision unit determines that the content including the plurality of comparison segments that corresponds to the plurality of comparison counterpart segments is present among the already acquired contents.

8. The server apparatus according to claim 7, wherein said content acquisition unit is configured to acquire, in a case of acquiring a plurality of candidate contents from the client device, the candidate contents with respect to which it has been determined that the content including the one comparison segment that corresponds to the acquired comparison counterpart segment is not present among the already acquired contents, in preference to the candidate contents with respect to which it has been determined that the content including the plurality of comparison segments that corresponds to the plurality of comparison counterpart segments is present among the already acquired contents.

9. The server apparatus according to claim 1,
wherein a priority is given in advance to each of a plurality of candidate contents, and
said content segment acquisition unit is configured to preferentially acquire the comparison counterpart segment of a candidate content having a higher priority among the plurality of candidate contents.

10. The server apparatus according to claim 9,
wherein said duplication decision unit is further configured to (i) determine, in the case where said duplication decision unit determines that the content including the one comparison segment that corresponds to the acquired comparison counterpart segment is present among the already acquired contents, whether a content including more than one comparison segment that corresponds to more than one of the plurality of comparison counterpart segments is present among the already acquired contents, and (ii) degrade the priority of the candidate content from the priority given in advance, in a case where said duplication decision unit determines that the content including the more than one comparison segment that corresponds to the more than one of the plurality of comparison counterpart segments is present among the already acquired contents.

11. The server apparatus according to claim 1,
wherein said duplication decision unit is further configured to determine whether a content including a plurality of comparison segments that corresponds to the plurality of comparison counterpart segments is present among the already acquired contents, in the case where said duplication decision unit determines that the content including the one comparison segment that corresponds to the acquired comparison counterpart segment is present among the already acquired contents, and
said content acquisition unit is configured:
to acquire the candidate content from the client device and store the acquired candidate content in the storage unit in a case where said duplication decision unit determines that the content including the plurality of comparison segments that corresponds to the plurality of comparison counterpart segments is not present among the already acquired contents; and
not to acquire the candidate content from the client device in a case where said duplication decision unit determines that the content including the plurality of comparison segments that corresponds to the plurality of comparison counterpart segments is present among the already acquired contents.

12. The server apparatus according to claim 1, further comprising a segment ID generation unit configured to (i) generate from the one comparison segment a comparison ID being a code of a fixed length having a smaller data size than the one comparison segment and representing the one comparison segment, and (ii) generate from the acquired comparison counterpart segment a comparison counterpart ID being a code of a fixed length having a smaller data size than the acquired comparison counterpart segment and representing the acquired comparison counterpart segment,
wherein said duplication decision unit is configured to compare the comparison counterpart ID and the comparison ID, so as to compare the acquired comparison counterpart segment and the one comparison segment.

13. The server apparatus according to claim 12, wherein said segment ID generation unit is configured to generate the comparison ID and the comparison counterpart ID based on a hash function.

14. The server apparatus according to claim 1, wherein said server apparatus is configured as an integrated circuit.

15. A method of acquiring a content from a client device for storing the content in a storage unit, said method comprising:
sequentially acquiring, from the client device, comparison counterpart segments constituting a part of a candidate content, each of the comparison counterpart segments respectively corresponding to one of a plurality of comparison segments constituting a part of one or more already acquired contents stored in the storage unit;
comparing, while said sequentially acquiring continues to sequentially acquire the comparison counterpart segments constituting the part of the candidate content, an acquired comparison counterpart segment and the one of the comparison segments corresponding to the acquired comparison counterpart segment each time one of the comparison counterpart segments is acquired in said sequentially acquiring;
determining, based on a result of said comparing, whether a content including the one comparison segment that corresponds to the acquired comparison counterpart segment is present among the already acquired contents; and
acquiring the entire candidate content from the client device and storing the acquired candidate content in the storage unit in a case where said determining determines that the content including the one comparison segment that corresponds to the acquired comparison counterpart segment is not present among the already acquired contents,
wherein said sequentially acquiring further includes aborting an acquisition of a comparison counterpart segment that is subsequent to a currently acquired comparison counterpart segment of the part of the candidate content, in the case where said determining determines that the content including the one comparison segment that corresponds to the acquired comparison counterpart segment is not present among the already acquired contents.

16. A non-transitory computer-readable recording medium on which a program causing a computer to execute said method according to claim 15 is recorded.

* * * * *